United States Patent
Bagnell et al.

(10) Patent No.: US 6,687,215 B1
(45) Date of Patent: Feb. 3, 2004

(54) LOW PROFILE AND MEDIUM PROTECTING CARTRIDGE ASSEMBLY

(75) Inventors: Glade Bagnell, Longmont, CO (US); Thomas E. Berg, Fort Collins, CO (US); David William Niss, Boulder, CO (US); Robert David Freeman, Erie, CO (US); Edwin J. Wadsworth, Longmont, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 0 days.

(21) Appl. No.: 09/548,128

(22) Filed: Apr. 12, 2000

(51) Int. Cl.[7] .............................................. G11B 23/03
(52) U.S. Cl. ........................................................ 369/291
(58) Field of Search ................................ 369/289, 290, 369/291; 360/133

(56) References Cited

U.S. PATENT DOCUMENTS

| | | | |
|---|---|---|---|
| 5,046,170 A | | 9/1991 | Oshima et al. .............. 360/133 |
| 5,175,726 A | * | 12/1992 | Imokawa ..................... 360/133 |
| 5,546,376 A | | 8/1996 | Taniyama .................... 369/291 |
| 5,903,542 A | * | 5/1999 | Sandell et al. .............. 360/133 |
| 6,108,299 A | * | 8/2000 | Kano et al. .................. 369/291 |
| 6,198,598 B1 | * | 3/2001 | Meguro ....................... 360/133 |

FOREIGN PATENT DOCUMENTS

| | | |
|---|---|---|
| DE | 197 19 975 | 11/1997 |
| EP | 0 215 958 | 4/1987 |
| EP | 0 339 651 | 11/1989 |
| EP | 0 358 442 | 3/1990 |
| EP | 0 393 858 | 10/1990 |
| EP | 0 440 175 | 8/1991 |
| EP | 0 496 511 | 7/1992 |
| EP | 0 526 222 | 2/1993 |
| EP | 0 752 704 | 1/1997 |
| EP | 0 895 241 | 2/1999 |
| EP | 0 929 070 | 7/1999 |
| EP | 0 982 729 | 3/2000 |

OTHER PUBLICATIONS

PCT Written Opinion for Application No. PCT/US01/12340, Mar. 20, 2002 (2 pages).

* cited by examiner

*Primary Examiner*—David L. Ometz
(74) *Attorney, Agent, or Firm*—MacPherson Kwok Chen & Held LLP

(57) ABSTRACT

Various configurations of cartridges for optical disks, particularly first-surface optical disks, are provided. The cartridges include a plurality of protectors for use in safeguarding the optical disk when certain conditions are present or certain events occur. The protectors include an elongated shutter that covers the hub assembly, at least annular slot portions inside of the cartridge to restrain movement of the disk within the cartridge, a locking subassembly to hold the shutter in a desired position, and a mechanism for preventing complete insertion of the cartridge into an optical drive when the cartridge is in the wrong orientation relative to the drive.

6 Claims, 35 Drawing Sheets

LOW PROFILE AND MEDIUM PROTECTING CARTRIDGE ASSEMBLY

CROSS-REFERENCE TO RELATED APPLICATIONS

The present application is related to U.S. patent application Ser. No. 09/315,398, filed May 20, 1999, entitled "Removable Optical Storage Device and System," U.S. Provisional Application No. 60/140,633, filed Jun. 23, 1999, entitled "Combination Mastered and Writeable Medium and Use in Electronic Book Internet Appliance," U.S. patent application Ser. No. 09/393,899, filed Sep. 10, 1999, entitled "Content Distribution Method and Apparatus," U.S. patent application Ser. No. 09/393,150, filed Sep. 10, 1999, entitled "Writeable Medium Access Control Using a Medium Writeable Area," U.S. patent application Ser. No. 09/457,104 filed Dec. 7, 1999, entitled "Low Profile Optical Head," U.S. Patent Application Ser. No. 09/560,781 entitled "Miniture Optical Disk for Data Storage, " and U.S. Patent Application Ser. No. 09/815,377 entitled "Tilt Focus Method and Mechanism for an optical Drive," all of which are incorporated herein by reference in their entireties.

FIELD OF THE INVENTION

The present invention is directed generally to a low profile cartridge and specifically to a low profile cartridge for an optical disk.

BACKGROUND OF THE INVENTION

A number of disk-shaped optical storage media have been developed for use in storing various types of digital data in a manner such that the media can be readily removed from the read/write or drive device for which it is designed. A common type of optical media is second-surface optical media. In accordance with one definition, second-surface optical media can be defined in terms of the read operation that is conducted when reading information from the media. In particular, a second-surface optical medium can refer to a medium in which the read beam is incident on the substrate of the optical medium or disk before it is incident on the information content portions thereof.

The relatively thick and transparent substrate of second-surface optical media makes read-only or read-write operations relatively insensitive to dust particles, scratches and the like which are located more than 50 wavelengths from the information content portions thereof. On the other hand, the second-surface optical medium can be relatively sensitive to various optical aberrations. These optical aberrations include: (1) tilt of the substrate relative to the optical axis; (2) substrate thickness variations; and/or (3) substrate birefringence.

Another drawback associated with second-surface optical media is that the optical requirements of such media are substantially inconsistent with the miniaturization of the disk drive and optical components for such media. As will be appreciated, a longer working distance (distance between the objective lens and the information content portions) is required for an optical system that will read information from or write information onto second-surface media. This is due to the relatively thick transparent layer through which the radiation must pass to access the information content portions. To provide the longer working distance, larger optical components (e.g., objective lens) are required.

Because of these disadvantages associated with second-surface optical media, a first-surface optical medium has been devised by the assignee of the present application. Although it may be subject to more than one definition, in one embodiment, the first-surface optical medium refers to a medium in which the read beam during a read operation is incident on or impinges on information content portions of the first-surface optical medium before it impinges on a substrate of the first-surface optical medium.

The first-surface medium offers numerous advantages over a second-surface medium. By way of example, with the first-surface medium, the radiation does not pass through the relatively thick substrate so that there is a relatively shorter optical path, in comparison with second-surface medium, thereby providing a significantly shorter working distance, in comparison with second-surface medium. Since there is a shorter working distance, a smaller objective lens diameter, for a given numerical aperture, can be utilized which results in smaller, lower mass optical components to achieve a greater degree of optical drive miniaturization. Furthermore, the first-surface medium is not sensitive to substrate birefringence and substrate thickness variations. The first-surface medium is also much less sensitive to substrate tilt.

However, because there is no protective layer with a first-surface optical medium, to protect it from damage or being subject to unwanted particles or debris, it is imperative that a sufficiently protective housing or cartridge be employed to contain the optical medium. There are a number of factors to be considered in designing the protective cartridge for first-surface optical media. The cartridge should include a number of complementary and/or redundant protective features. For example, the cartridge should have features to protect the enclosed first-surface disk from damage such as by scratches and abrasions caused by handling of the cartridge or rotation of the enclosed disk during read and/or write operations. As will be appreciated, the cartridge should be designed to prevent contact of a surface of the cartridge with the operational surface of the disk. The cartridge should have features to retard the entry of dust and other foreign matter into the interior of the cartridge. Such foreign matter can prevent the optical head from reading information from or writing information to the disk. The cartridge should have a small form factor to permit the cartridge to be used with small, hand-held electronic devices, such as PEDs (Personal Electronic Devices) and digital cameras. The cartridge should have features to self-locate the cartridge in the disk drive. Such features facilitate proper alignment of the operational surface and data tracks relative to the optical head. The cartridge should also have features permitting the use of a double-sided, first-surface, optical disk. In other words, the cartridge should permit the optical head to access both of the opposing operational surfaces of the disk.

SUMMARY OF THE INVENTION

These and other design considerations are satisfied by one or more of the cartridge embodiments of the present invention.

In a first embodiment of the present invention, an apparatus for use in an optical system is provided. The apparatus includes a cartridge assembly having upper and lower shutter members that move independently of one another. In particularly preferred configuration, a single mechanism, such as a rotary arm mounted in the disk drive, engages and moves each of the shutter members. In one configuration, the mechanism engages and moves a first (but not a second) shutter member when the cartridge assembly is inserted into the disk drive in a first orientation and engages and moves the second (but not the first) shutter member when the cartridge assembly is inserted into the disk drive in a second orientation that is different from the first orientation. In one application, the first orientation is the flip side (or reverse) of the second orientation.

In another embodiment, a cartridge assembly is provided that includes a double-sided optical medium, access openings (for the optical head) located on opposing surfaces of the cartridge assembly, and one or more shutter members that are movably disposed to cover or uncover (simultaneously or sequentially) the access openings. In this manner, the cartridge assembly can be inserted into the disk drive in a first orientation to reveal a first operational surface of the medium and in a second orientation to reveal a second operational surface of the medium. As noted above, the first orientation can be the flip side (or reverse) of the second orientation.

In yet another embodiment, an apparatus for use in an optical system is provided.

The apparatus includes:
(a) an optical storage medium (which can be first- or second-surface) having at least a first side for storing information;
(b) a hub assembly operatively associated with the optical storage medium; and
(c) a cartridge assembly that contains the optical storage medium and the hub assembly. The cartridge assembly includes a first optical storage medium protector for use in safeguarding the optical storage medium against the occurrence of one or more unwanted events and a second optical storage medium protector for use in safeguarding the optical storage medium against the occurrence of one or more second unwanted events. The unwanted events, for example, can be contact of the operational surface of the disk with a cartridge wall(s) due to inward deflection of the cartridge wall(s) by a user, contact of the operational surface of the disk with the cartridge wall(s) during rotation of the disk by a disk drive, and collection of foreign matter on the disk operational surface.

The first and second optical storage medium protectors are preferably selected from a variety of features.

In one configuration, the first and/or second optical storage medium protectors include a first major wall (e.g., a shutter wall) covering a hub member of the hub assembly. Not only does the cartridge wall block foreign matter from entering into the interior of the cartridge through a hole in the cartridge wall(s) to permit the disk drive to engage the hub member, but also the hub member provides structural support to the wall to resist deflection. In one configuration, an inner surface of the first major wall is spaced from the adjacent outer surface of the hub member such that, when a force is applied to the wall, the interior surface contacts the outer surface of the hub member to thereby constrain inward wall deflection, but does not contact the operational surface of the optical storage medium.

In another configuration, the first and/or second optical storage medium protectors include a locking subassembly having first and second positions. When the locking subassembly is in the first position, access to the hub member and/or optical storage medium is blocked (e.g., by a movable shutter wall member) and when the locking subassembly is in the second position access to the hub member and/or optical storage medium is available. In one design, a laterally movable wall or shutter is disposed so as to cover an access door in the cartridge wall for the optical head, as well as an opening in the cartridge wall for the hub member, in the first position and uncover the access door for the optical head, and the opening for the hub member, in the second position.

In yet another configuration, the cartridge assembly further includes a third optical storage medium protector. The third optical storage medium protector includes a medium constraining member having portions that overlie a peripheral edge of the optical storage medium. The third optical storage medium protector can be a annular slot positioned around the periphery of the medium for receiving a peripheral edge of the medium in between opposing surfaces of the slot. The opposing surfaces of the slot are interiorly offset from a surface of a wall of the cartridge to suspend the medium above, and avoid contact of the medium with the interior surface.

In yet another embodiment, an apparatus for use in an optical system is provided. The apparatus includes:
(a) a hub assembly having a total height and including at least a first hub member, with the total height including at least a height of the first hub member;
(b) an optical storage medium having a thickness and including a first side and a second side, with at least the first side storing information; and
(c) a cartridge assembly for containing the hub assembly and the optical storage medium. The cartridge assembly has a low profile. The ratio of the cartridge assembly height to the total height of the hub assembly is typically less than about 1.50 and more typically ranges from greater than 1.00 to about 1.25.

In yet a further embodiment, an apparatus for use in an optical system is provided. The apparatus includes:
(a) an optical storage medium; and
(b) a cartridge assembly including a holding feature (e.g., at least one of a locating pin and a locating hole) and a displacement feature (e.g., at least one of an anti-rotational pin and an anti-rotational slot). In one configuration, one of the locating pin and hole and one of the anti-rotational pin and slot are each located on the disk drive with the other being located on the cartridge housing. The anti-rotational slot has a larger cross-sectional extent or area than the locating hole to permit the disk drive to displace the cartridge housing along an arc extending along the anti-rotational slot (e.g., rotate the housing), the center of which is located at the center of the locating pin. In this manner, the disk drive is able to displace the cartridge housing as needed to correctly align the cartridge in a plane parallel to an operational surface of the medium. In another configuration, the disk drive includes one or more datum features (e.g., one or more contact surfaces) for contacting one or more surfaces of the cartridge assembly to correctly position the cartridge in a plane normal to the operational surface of the medium. These features facilitate alignment of the medium in the plane for substantially optimal focus and servo control.

In yet a further embodiment, a method is provided for safeguarding an optical storage medium. The method includes the steps of:
(a) providing a cartridge assembly including a housing having a major wall with an inner wall surface and containing (i) an optical storage medium side and (ii) a hub assembly joined to the optical storage medium, with one or more portions of the major wall covering a first hub member of the hub assembly; and
(b) opening a locking subassembly when access to the optical storage medium is being provided.

In yet another embodiment, an apparatus for use in an optical system is provided that includes:

(a) an optical storage medium having at least one operational surface for storing information; and (b) a cartridge assembly that contains the optical storage medium and includes a lockout subassembly. The cartridge assembly is properly insertable into a disk drive in a first orientation and improperly insertable into the disk drive in a second orientation. The lockout subassembly permits the cartridge assembly to be inserted fully into the disk drive in the first orientation and retards the cartridge assembly from being inserted fully into the disk drive in the second orientation.

In one configuration, the lockout subassembly includes a slot for engaging a rotary arm located in the disk drive, thereby inhibiting full insertion of the cartridge assembly in the second orientation. The cartridge assembly can include a second lockout subassembly located on an opposing side of the cartridge assembly from the first lockout subassembly to safeguard the cartridge from being improperly inserted when the cartridge assembly is flipped over.

As will be appreciated, the foregoing summary of the invention is neither exhaustive nor complete. Other embodiments including one or more of the features referred to above and/or one or more of the features discussed below are envisioned by the present disclosure.

DETAILED DESCRIPTION

Figure 1:
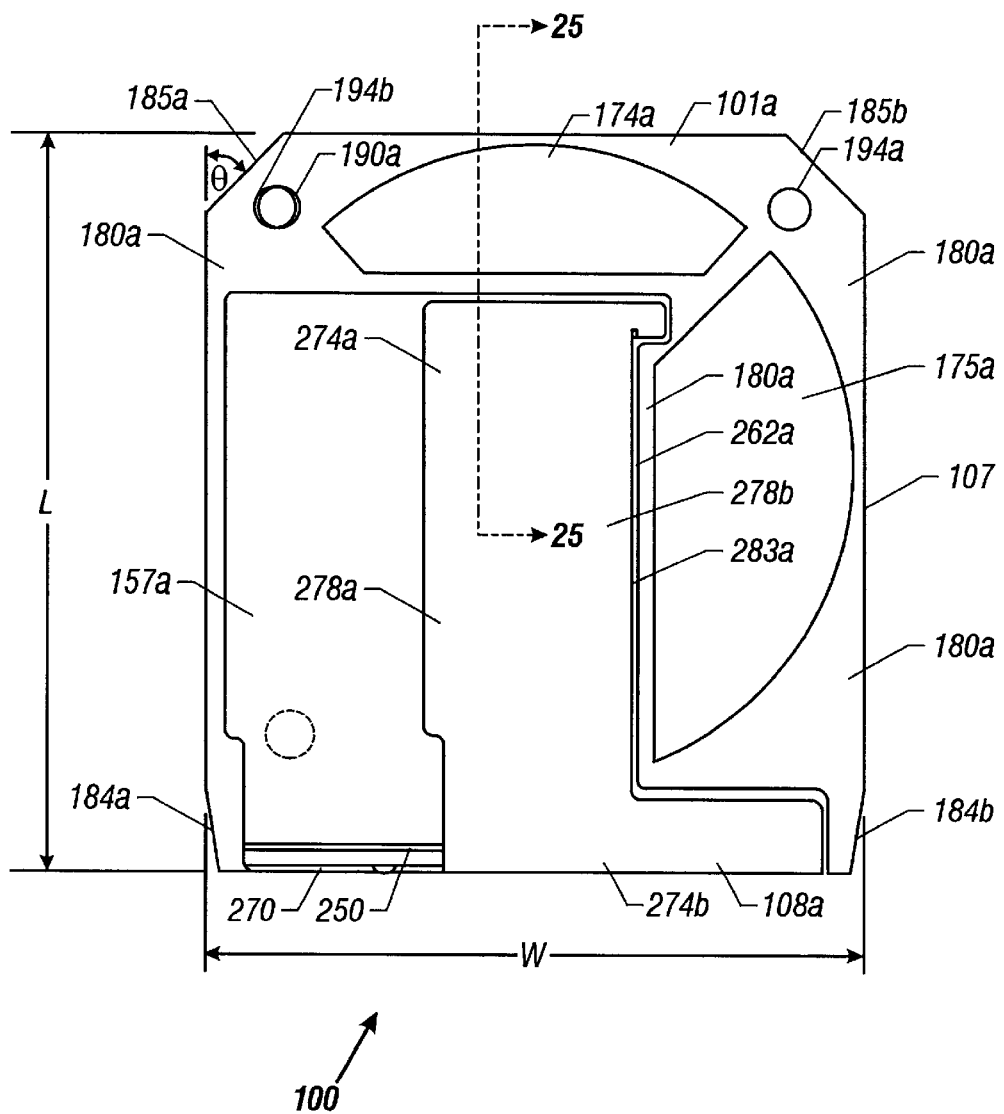
FIG. 1 is a top plan view of a cartridge assembly according to a first embodiment of the present invention.

Referring to FIGS. 1–6 and 22–23, a removable, recordable or prerecorded optical, magnetic, or magneto-optical storage cartridge assembly 100 according to a first embodiment of the invention is depicted. The cartridge assembly includes first and second housing members 104a and 104b (FIGS. 2 and 6) (which are identical to one another), first and second shutter members 108a and 108b (FIGS. 2 and 6) (which are also identical to one another), locking arms 113a,b (which are also identical to one another) and an information-containing medium 116 (which is preferably an optical, first- surface medium). The first and second housing members define a substantially rectangular sidewall 107 (FIG. 1) having substantially planar top and bottom surfaces to enclose and protect the medium 116 (which is typically double-sided).

Referring to FIG. 1, the form factor of the cartridge assembly can be relatively small. In one configuration, the width "W" of the cartridge assembly is less than about 40 mm, and typically ranges from about 30 to about 37 mm, the length "L" is less than about 42 mm and typically ranges from about 30 to about 40 mm, and the height "H" (FIG. 3) is less than about 5 mm and typically ranges from about 1 to about 3 mm. In another configuration, the cartridge assembly has a mass less than about 7 gm, preferably less than about 5 gm.

In one configuration (FIGS. 2 and 4), the medium 116 is a double-sided rigid or semi-rigid film-type disk and is joined to a rigid or semi-rigid hub assembly 106 having first and second hub members 124a,b. The medium 116 and hub assembly 106 are described in co-pending application Ser. No. 09/560,781 entitled "Miniature Optical Disk for Data Storage," which is hereby incorporated by reference.

The first and second housing members 104a,b form the primary enclosure for the medium 116. The housing members 104a,b each contain interlocking features 105a–f (e.g., pin-and-hole (shown in FIGS. 2 and 6) and tab-and-slot arrangements and the like) that make them self-locating with respect to one another during manufacture. Each of the housing members 104a,b includes a circular opening 120a,b for receiving the first or second hub member 124a,b attached to opposing sides of the medium 116 (for a double-sided disk) and a window 128a,b (FIGS. 2 and 6) to permit the optical head (not shown) to access the medium 116 during read and/or write operations. Although the window 128 is normally an empty space, the window can be covered by a (non-movable) transparent material (at least at the wavelength of the read/write beam) for additional protection of the medium. Examples of cover materials include glass and polycarbonate.

The first and second housing members 104a,b are preferably made by injection molding of a thermosplastic material, though other processes (such as stamping, machining, and the like) and other materials (such as aluminum, steel, or other metals, resins, fiberglass, ceramics and the like) can also be used. The polycarbonate can include a filler that is a lubricant such as "TEFLON" glass, or graphite to provide lubricity for moving parts and/or a filler than is an anti-static (or conductive) material such as metal powders. In one configuration, one or both housing members 104a,b are composed of a translucent (unclear or colored) or transparent (clear) material, such as a polycarbonate, to facilitate ultraviolet curing of an adhesive used to join the members. As will be appreciated, the adhesive is cured by illuminating the adhesive with ultraviolet light.

Figure 25:
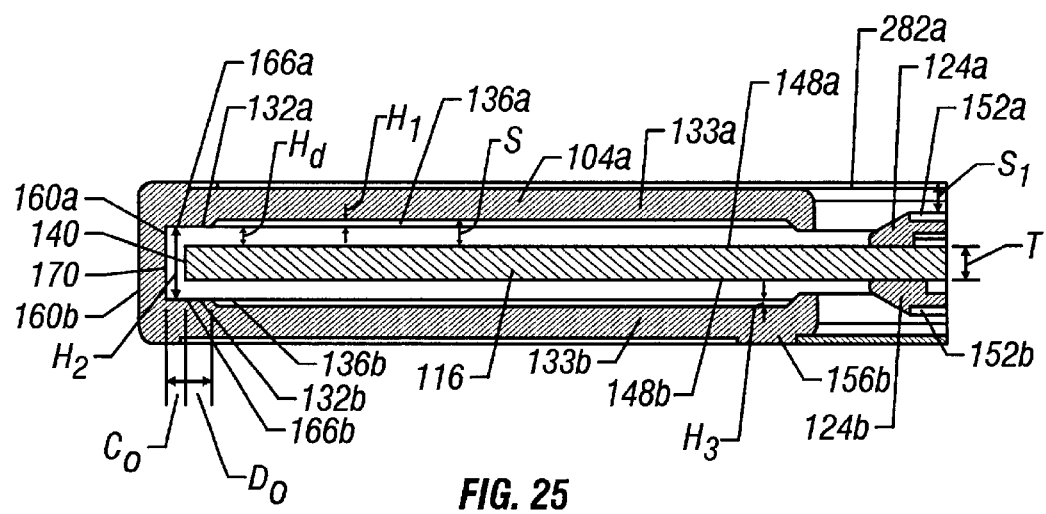
FIG. 25 is a cross-sectional view along line 25—25 of FIG. 1.

Each of the first and second housing members 104a,b has an offset, annular, disk-shaped, interior surface 132a,b (FIGS. 2 and 6) to hold the medium 116 therebetween. Referring to FIG. 25, the surface 132a,b is bounded by a radial or annular step 136a,b located interiorly of the peripheral edge 140 of the medium 116 (i.e., the radial distance from the step 136 to the hub center 144 (FIGS. 2 and 6) is less than the radial distance from the peripheral edge 140 of the medium to the hub center 144). Radially disposed walls 160a,b are combined when the housing members 104a,b are joined together. The wall 160 and opposing walls 166a,b define an annular slot for receiving and constraining movement of medium portions adjacent to the peripheral edge 140 of the medium 116.

With this configuration, each of the operational surfaces 148a,b of the medium 116 is spaced a distance "S" (FIG. 25) from each of the interior surfaces 133a,b of the housing members 104a,b. This prevents the interior surfaces 133a,b from contacting the adjacent operational surfaces 148a,b. Such contact could occur in response to compression of the cartridge assembly walls 156a,b by a user, movement of the medium 116 in the cartridge assembly during handling by the user (medium 116 is loosely mounted within the cartridge assembly to permit alignment of the medium 116 independent of the position of the housing members 104a,b), insertion or ejection of the cartridge into or from the disk drive, and/or rotation of the medium 116 when the medium 116 is warped. In one configuration, the distance "S" ranges from about 0.3 to about 0.5 mm. In another configuration, the height "$H_1$" of the step 136a,b typically ranges from about 0.1 to about 0.2 mm, or from about 16% to about 33% of the thickness "T" of the medium 116, and the distance "$H_2$" between opposing interior walls 166a,b of the annular slot ranges from about 0.5 to about 0.7 mm or from about 85% to about 115% of the thickness "T".

The formed radially disposed wall 160 is located exteriorly of the peripheral edge 140 of the medium 116 (i.e., the radial distance from the wall 160 to the hub center 144 is more than the radial distance from the peripheral edge 140 of the medium 116 to the hub center 144) to enclose the medium 116 within the cartridge. The clearance "$C_o$" between the peripheral edge 140 of the medium 116 and the wall 160 should be as small as possible for the medium 116 to be centered in the disk drive and typically ranges from about 0.2 to about 0.4 mm. The overlap distance "$D_o$" from the step 136 to the medium peripheral edge 140 typically is less than the clearance $C_o$.

To provide further constrainment of vertical movement of the medium 116 in the cartridge assembly and protection of the information-containing surface(s) of the medium from harmful contact with a housing member 104 surface, each of the housing members 104a,b includes a rim or radial step 152a,b (FIGS. 2 and 6) adjacent to and bounding the circular openings 120a,b. The height "$H_3$" (FIG. 25) of the radial step 152 above the surface 133 typically ranges from about 0.1 to about 0.3 mm. A radial distance "$D_r$" (FIGS. 2 and 6) is defined between the radial steps 152 and 136 (relative to hub center 144).

Figure 2:
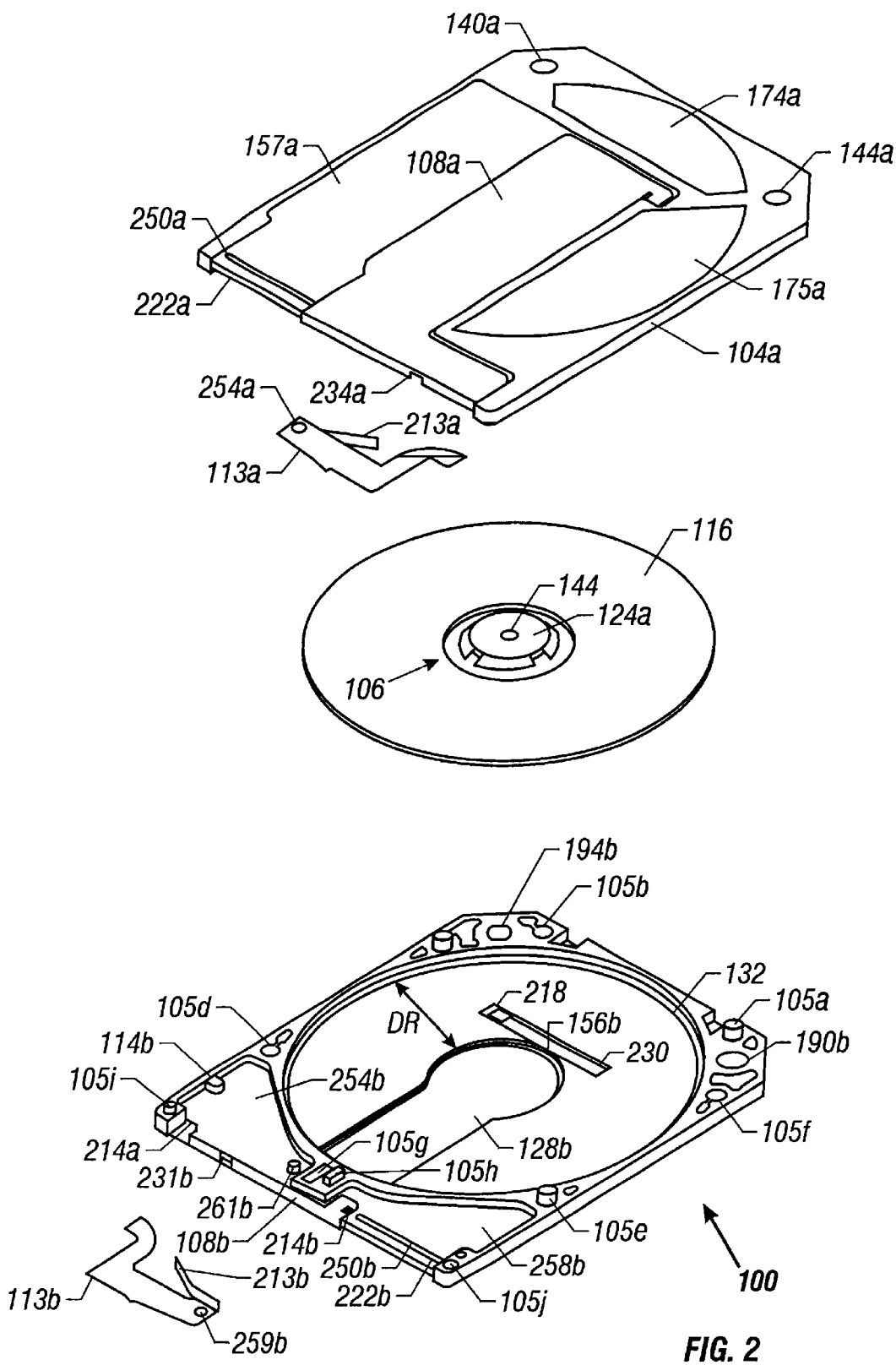
FIG. 2 is a disassembled view of the cartridge assembly of FIG. 1.
Figure 6:
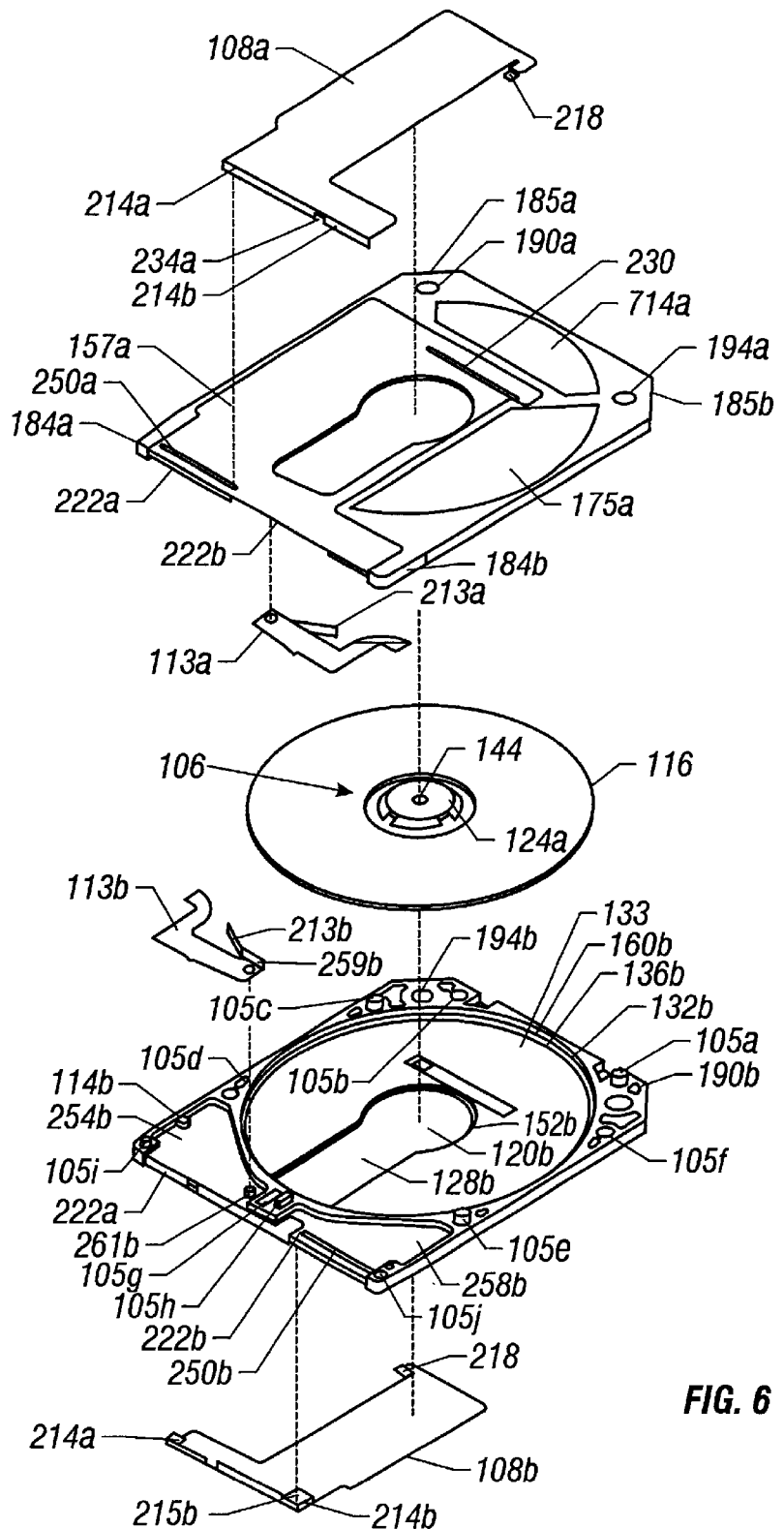
FIG. 6 is another disassembled view of cartridge assembly of FIG. 1.

Referring to FIGS. 1–2 and 6, the first and second housing members 104a,b have indented surfaces 174a,b and 175a,b for labels. The depth of the indented surfaces relative to the surrounding raised outer wall portion 180a,b of the members 104a,b is typically from about 0.1 to about 0.3 mm.

Figure 3:
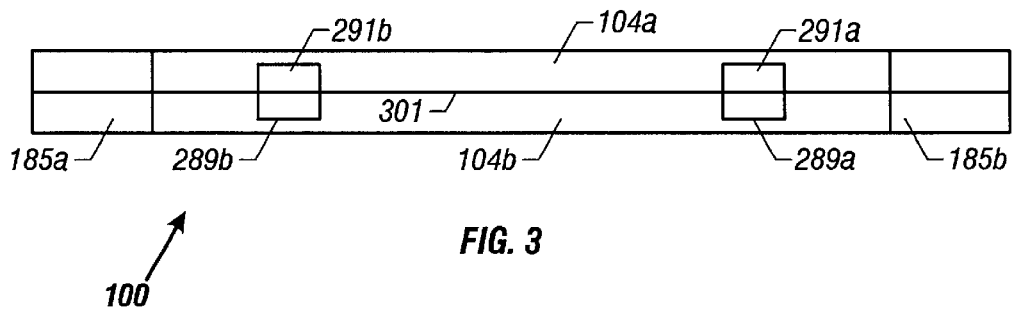
FIG. 3 is a rear end view of the assembled cartridge assembly of FIG. 1.
Figure 5:
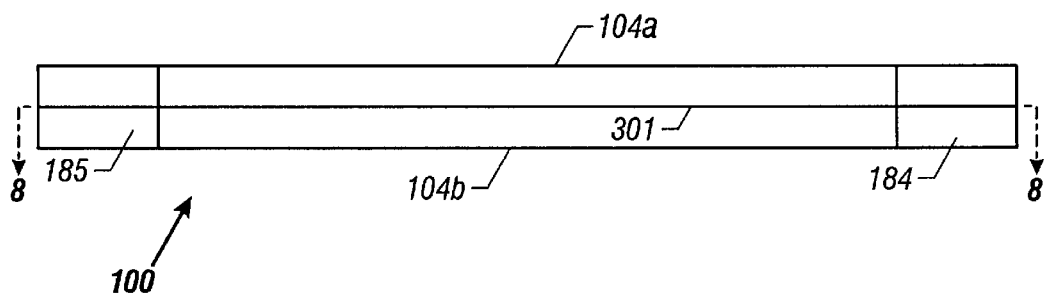
FIG. 5 is side view of the assembled cartridge assembly of FIG. 1.

The first and second housing members 104a,b are configured to end or side load (straight insertion) into a disk drive 177 (FIGS. 12–21). Compared to top loading, end or side loading provides a self-contained volume in which all drive functions are contained. To facilitate end or side loading, each housing member 104a,b has left and right lead-in radii 184a,b and lead-out chamfers 185a,b for cartridge ejection (FIGS. 3, 5, and 6). In one configuration, the chamfer angle θ (FIG. 1) common to the lead-out chamfers 184a–d ranges from about 25° to about 75°.

Figure 4:
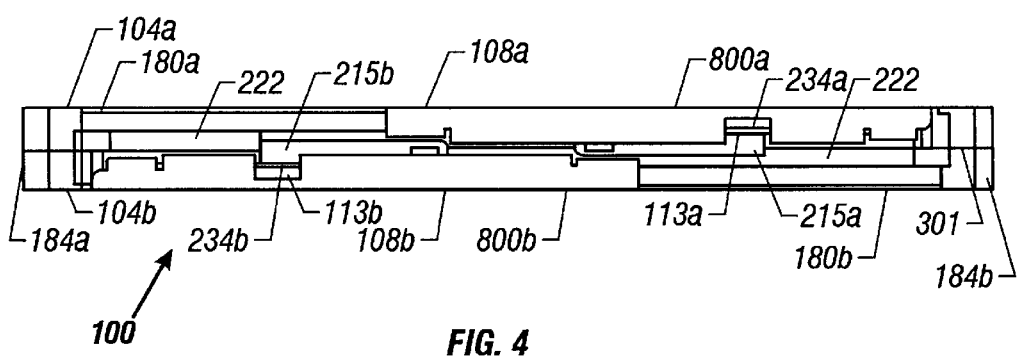
FIG. 4 is a front end view of the assembled cartridge assembly of FIG. 1 with both shutter members in the closed and locked position.

Referring to FIGS. 1–23, the windows 128a,b in the first and second housing members 104a,b are covered by a respective "L"-shaped shutter member 108a,b when the cartridge assembly 100 is not inserted in the disk drive 177 (FIGS. 26–29) and uncovered by (lateral or alternatively rotational) movement of the respective shutter member when the cartridge assembly 100 is inserted in the disk drive 177 to permit the optical head 206 (FIG. 26) to access the medium 116 via the pertinent window 128a,b. As discussed in detail below, during insertion of the cartridge assembly into the drive, the shutter member 108a,b for the pertinent window to be accessed by the optical head 206 is moved laterally as shown in FIGS. 11–16B by a rotary arm 700 and locking plate 704 in the disk drive. The other shutter member 108a,b remains stationary during the insertion process. This is shown in FIG. 4 which illustrates that the two shutter members 108a,b are vertically spaced apart from one another to permit independent movement.

The L-shape of the shutter member provides several benefits during the opening and closing of the shutter member. The elongated base portion of the "L" (which is located at the front of the cartridge assembly 100) provides stability and guidance during shutter member movement and thereby inhibits cocking and/or jamming of the shutter member. The narrow top portion of the "L" (which is located in the central and rear portions of the cartridge assembly 100) allows for more label area than a rectangular shutter member. The L-shaped shutter member does not contact the label area as in the case of a rectangular shutter member.

Figure 7:
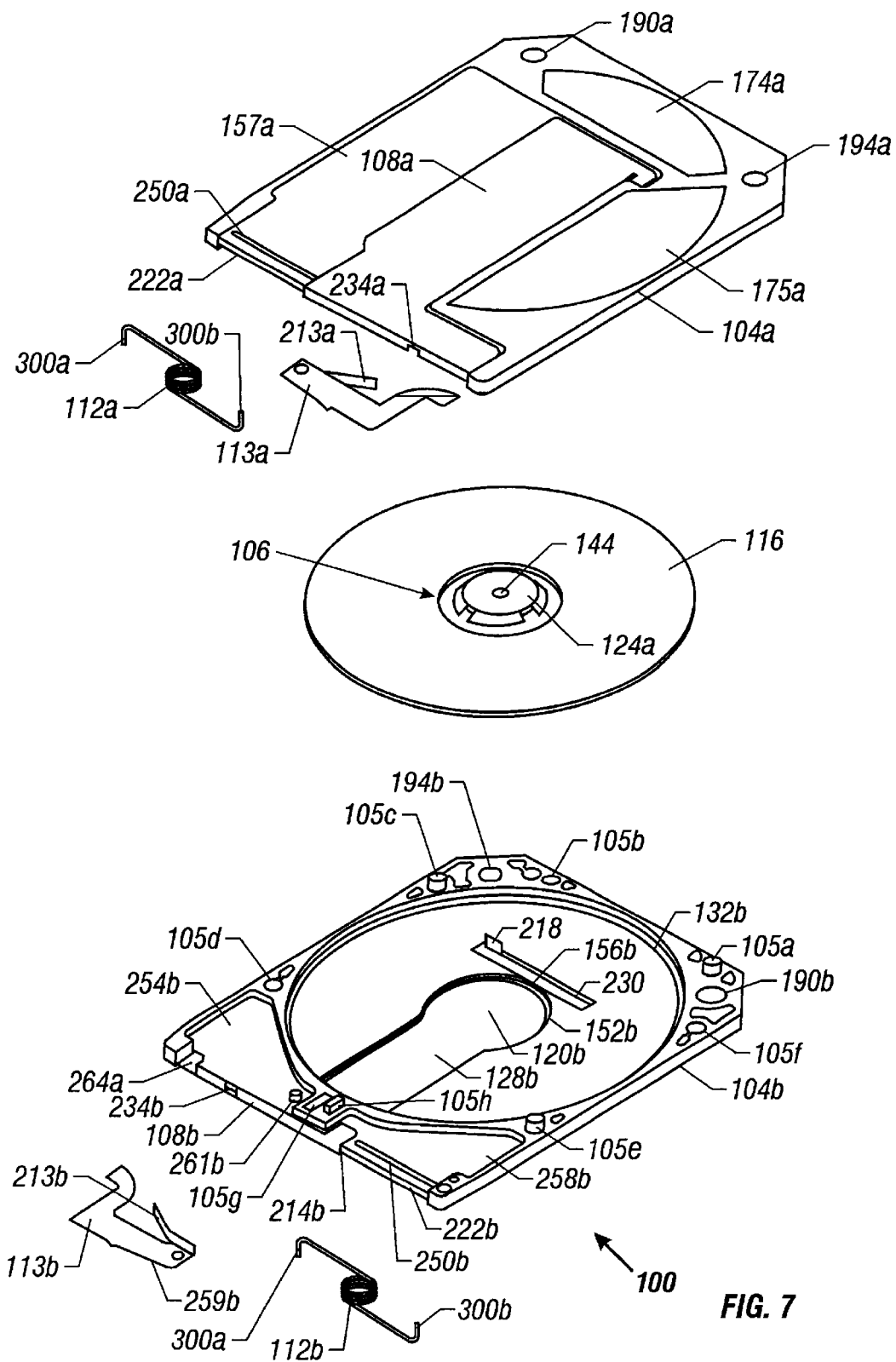
FIG. 7 is another disassembled view of cartridge assembly of FIG. 1.

Each shutter member 108 includes inwardly facing tabs 214a,b and a tab 218. Tabs 214a,b ride in slots 222a,b, respectively, and tab 218 engages a corresponding slot 230 in the respective cartridge housing member 104a,b. During manufacture, tab 218 is inserted into slot 230 and is bent downwardly as shown in FIGS. 3 and 6–7 to avoid contact of the tab 218 with (and damage to) information-containing portions or the operational surface of the medium 116. The movement of the tabs in the slots permits lateral movement of the shutter members in response to the rotary arm in the disk drive assembly 177 rotatably engaging the slot 234a,b in the pertinent shutter member and applying a lateral force thereto to cause lateral (side-to-side) displacement of the shutter member. The design of a suitable insertion mechanism (e.g., rotary arm device) and ejection mechanism is described in Ser. No. 09/315,398 filed May 20, 1999 (which is incorporated herein by this reference).

To permit lateral displacement of each shutter member 108a,b without contact of the tab 218 with the medium 116, each housing member 104a,b includes an indented surface 157a,b (FIGS. 2 and 6) to provide travel area for the shutter member and an indented surface 156a,b to provide travel area for the outwardly facing tab 218. The indented surface 157a,b has a depth relative to the adjacent raised wall portions 180a,b typically ranging from about 0.05 to about 0.20 mm. The indented surface 156a,b has a depth relative to the adjacent surface 133a,b typically ranging from about 0.02 to about 0.10 mm.

To fixedly hold the shutter member when in the closed position and to return the shutter member to the closed position after removal of the cartridge assembly from the disk drive (i.e., disengagement of the rotary arm 269 from the slot 234), a locking subassembly is provided. The locking subassembly includes a locking arm 113a,b.

Figure 8:
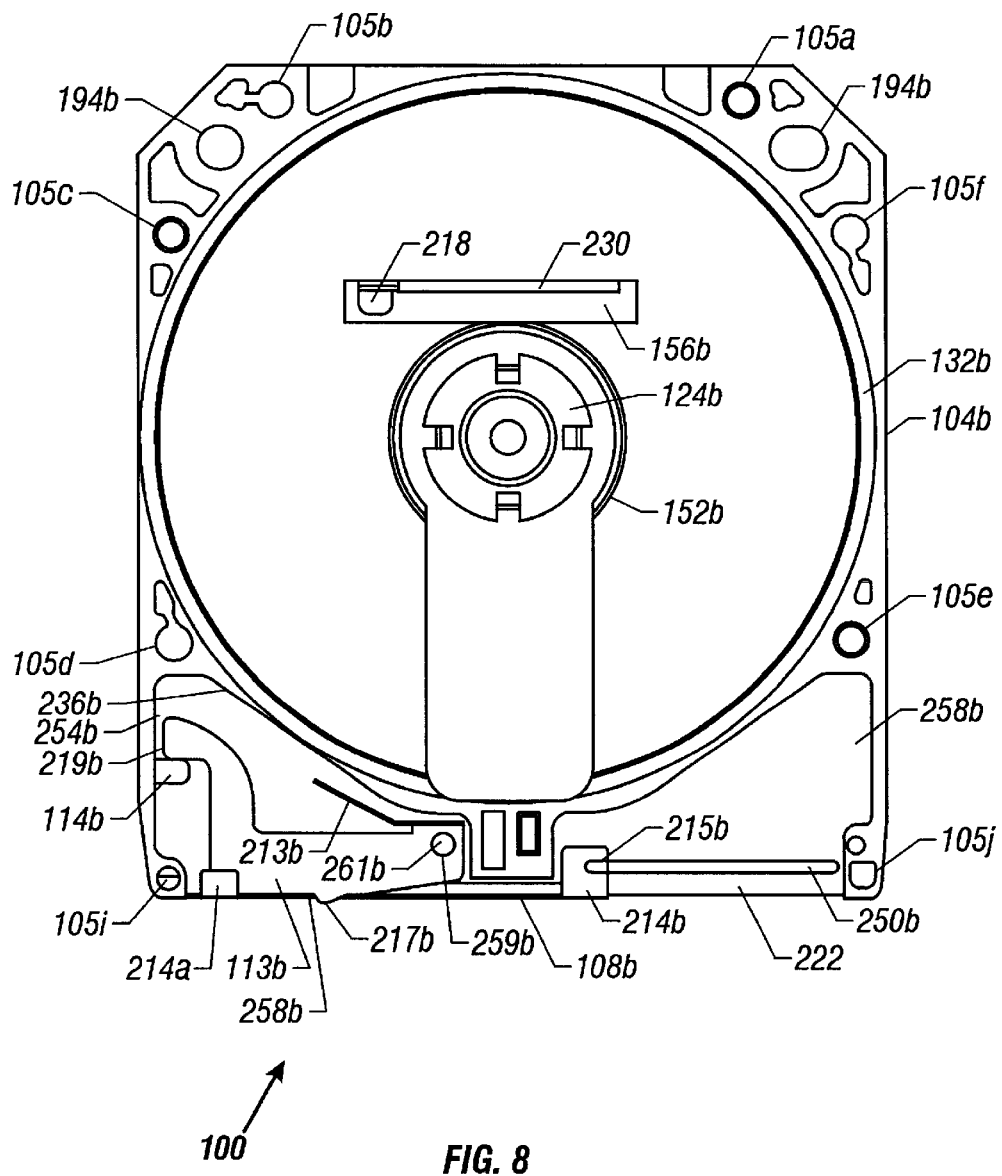
FIG. 8 is a sectional view taken along line 8—8 of FIG. 5 when the shutter member is in the closed position (the disk being removed for purposes of illustration)

Referring to FIGS. 6 and 8, the locking arm 113 includes a spring member 215 to resist displacement of the locking arm 113, a locking nub 217 that engages the slot 234 in the shutter member 108, and a stop arm 219 that restricts outward (counterclockwise rotational) and inward (clockwise rotational) movement of the locking arm 113. The locking arm 113 is rotatably disposed in between the corresponding opposing surfaces 254a,b and 258a,b by means of a hole 259a,b in the locking arm 113 which engages a corresponding pin 261a,b connected to the housing member 104a,b (FIGS. 2 and 6). When the locking nub 217a,b engages the slot 234a,b (FIG. 9), the spring member 215a,b exerts little or no outward force against the bearing surface 263a,b of the housing member 104a,b. The spring member 215a,b, however, applies a resistive force against removal of the locking nub 217a,b from the slot 234a,b and lateral movement of the respective shutter member 108a,b, with the magnitude of the resistive force being directly proportional to the degree of displacement (clockwise rotation) of the locking arm 113.

The wall 236 and the displacement controlling member 114a,b of the housing member 104a,b control rotational displacement of the locking arm 113a,b to prevent overcompression and damage of the spring member 215. This can occur, for example, when a user unlocks the shutter member by using an object to dislodge the locking nub inwardly. As will be appreciated, the degree of rotational movement of the locking arm in the clockwise direction is limited by the engagement of the rear of the stop arm 219 and the wall 236. The degree of rotational movement of the locking arm in the counterclockwise direction is limited by the engagement of the front of the stop arm 219 and the member 114.

FIG. 7 shows an alternative configuration of the cartridge assembly 100 that includes two spring members 112a,b to assist closure of the shutter members 108a,b (by resisting the opening of the respective shutter member engaging the spring member). Each spring member 112 has a plane of flexure substantially parallel to the inner walls or surfaces 254a,b and 258a,b of the housing members. The spring member 112a is provided between the opposing surfaces 254a and 258a of the housing members 104a,b. The spring member 112b is provided between the opposing surfaces 254b and 258b of the housing members 104a,b. Each spring member 112a,b is positioned in a spring guide slot 250a,b in an associated housing member 104a,b and is received in an indentation 115 in tab 214a,b to thereby bias the corresponding tab 214a,b of the shutter member 108a,b. The ends 300a,b of the spring members 112a,b are transverse to the plane of flexure of the spring member to permit the ends to ride in spring guide slots 250a,b and bias the end of each tab 214a,b of each shutter member 108a,b.

As shown in FIGS. 11–16B, a drawer assembly receives the cartridge and cooperates with the cartridge assembly to open the shutter member. The drawer assembly includes a rotary arm 700 movably (rotatably) engaging a locking plate 704 via a pin 708; a sleeve 117 for receiving the cartridge assembly, and a partial cover 716. The sleeve 117 includes leaf springs 720a,b to facilitate insertion of the cartridge assembly in the sleeve 117 and centering of the disk on the disk drive and disks 712a–c which are received in guide tracks (not shown) in the disk drive for movement in direction 724 of the sleeve 117. The sleeve 117, pin 708, cover 716, and disks 712a–c are typically formed from metal such as stainless steel. The locking plate 704 is also typically formed from metal, with brass being preferred. The rotary arm 700 can be formed from metal or plastic.

Figure 9:
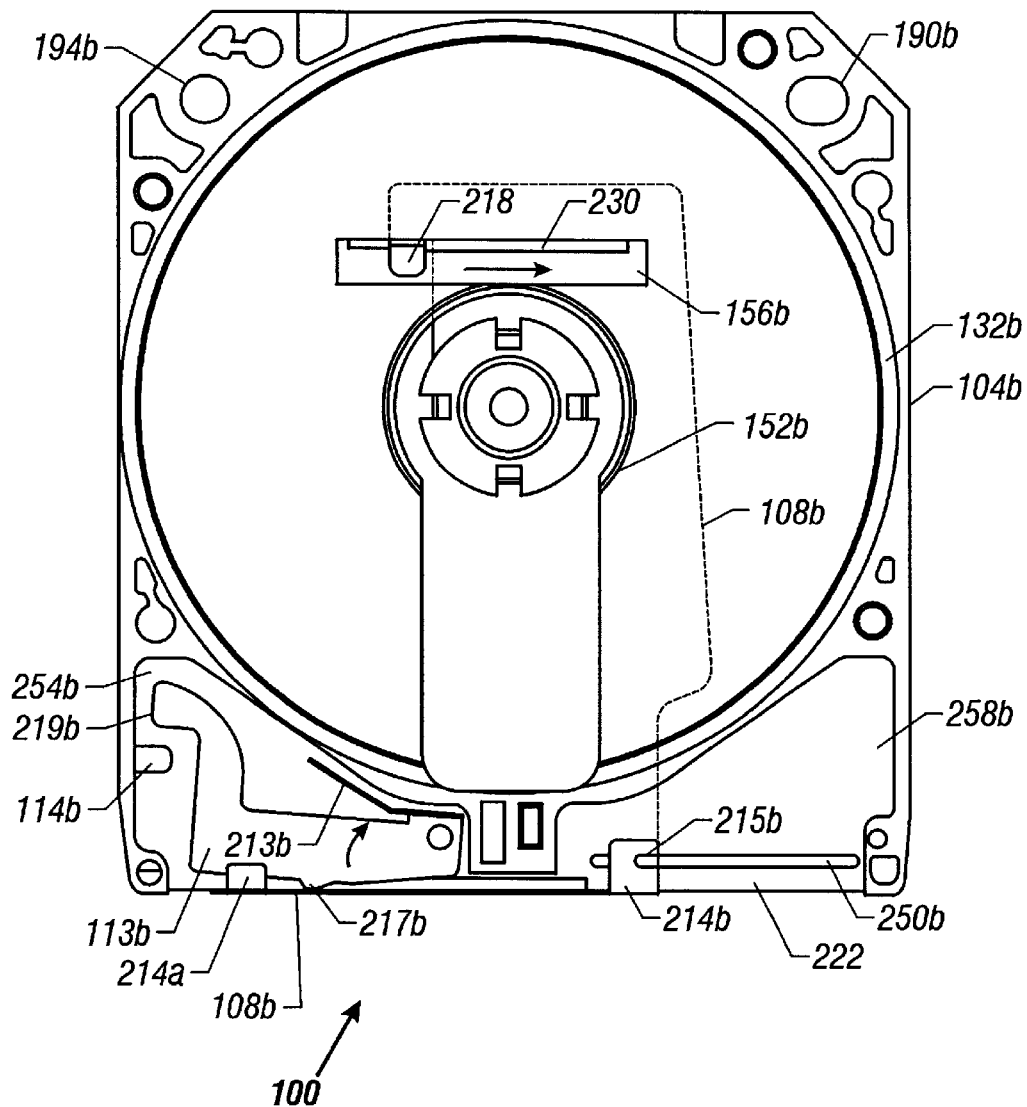
FIG. 9 is a sectional view taken along line 8—8 of FIG. 5 when the shutter member is in the partially open (unlocked) position (the disk being removed for purposes of illustration)
Figure 10:
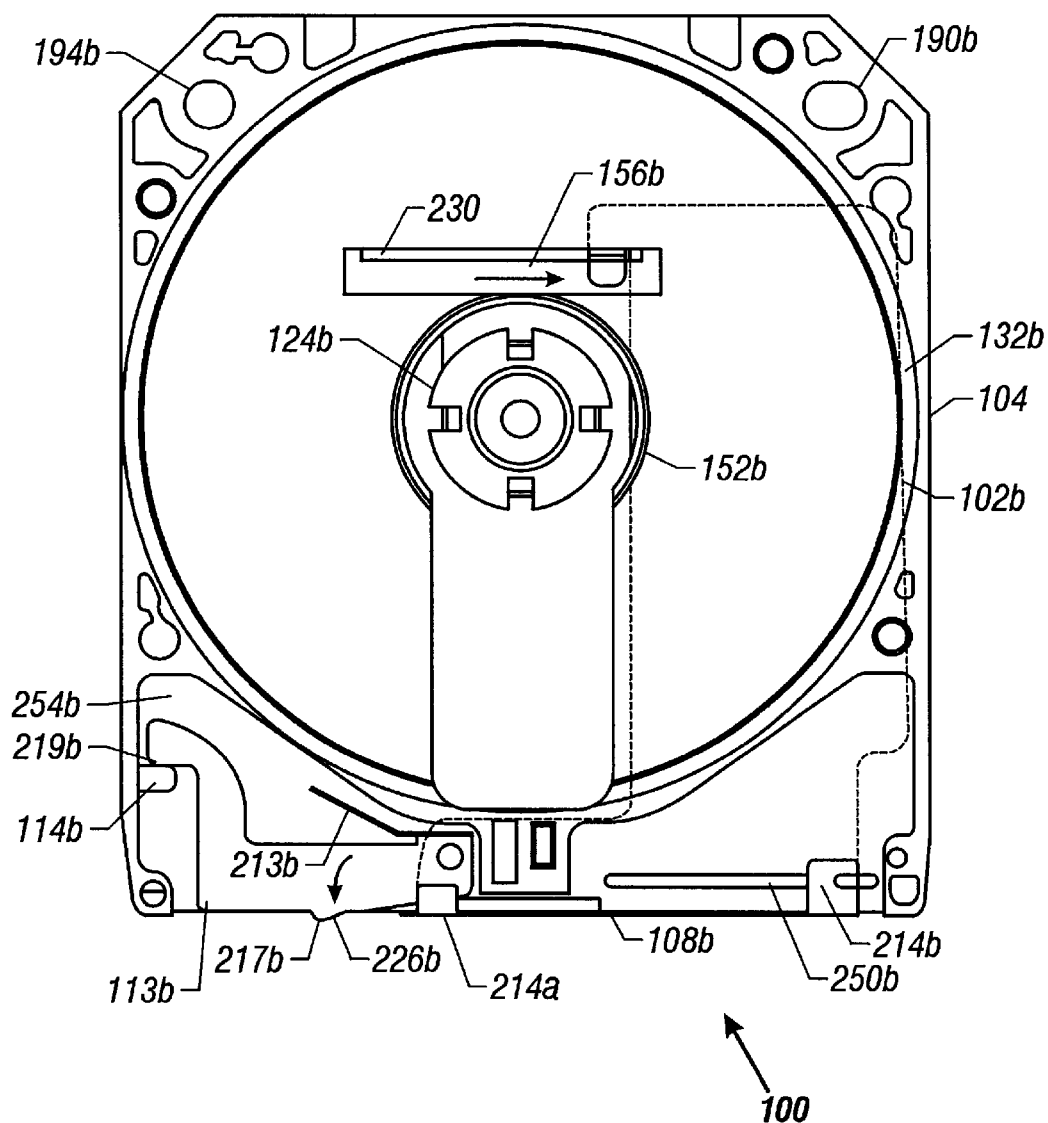
FIG. 10 is a sectional view taken along line 8—8 of FIG. 5 when the shutter member is in the fully open (unlocked) position (the disk being removed for purposes of illustration)
Figure 11:
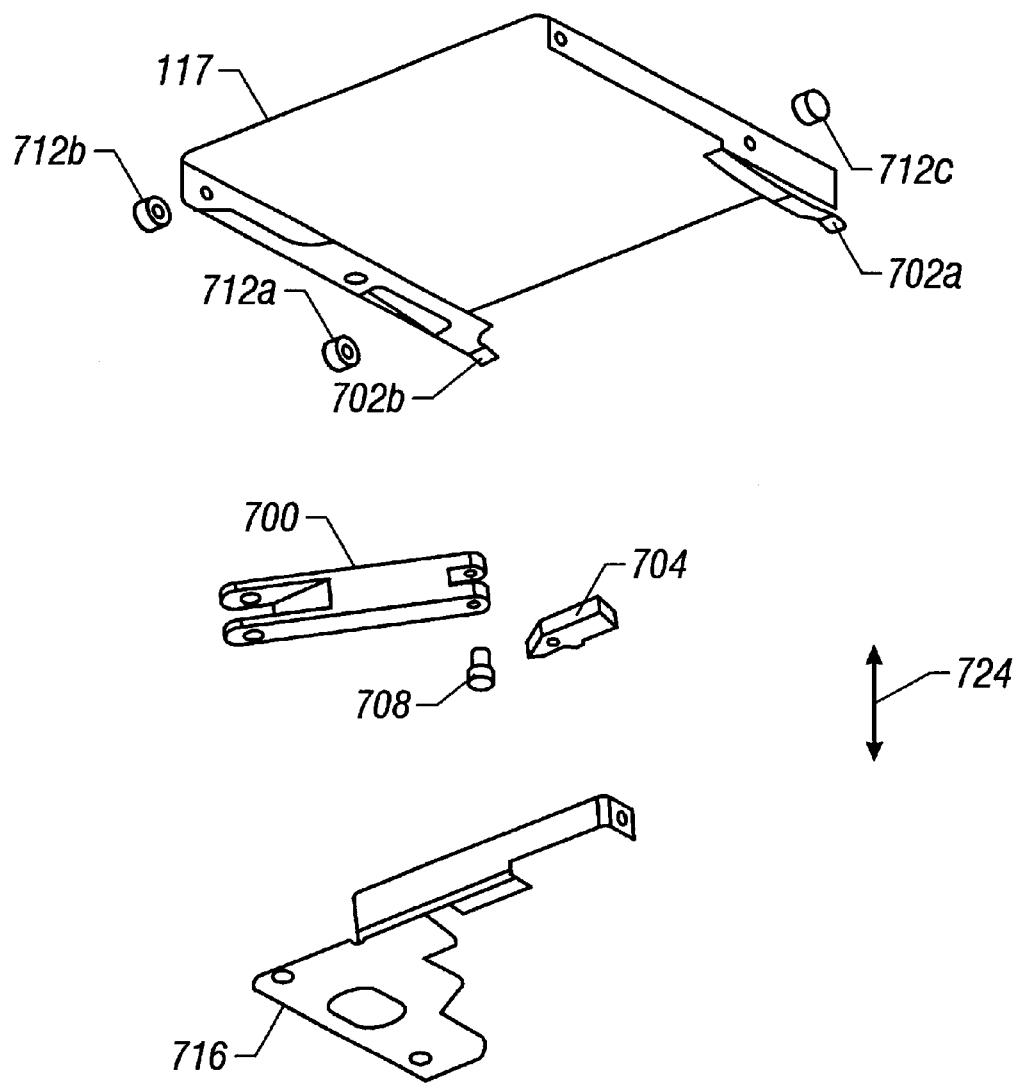
FIG. 11 is a disassembled view of a drawer assembly for receiving the cartridge assembly (with the top of the page facing away from the disk drive spindle)
Figure 12:
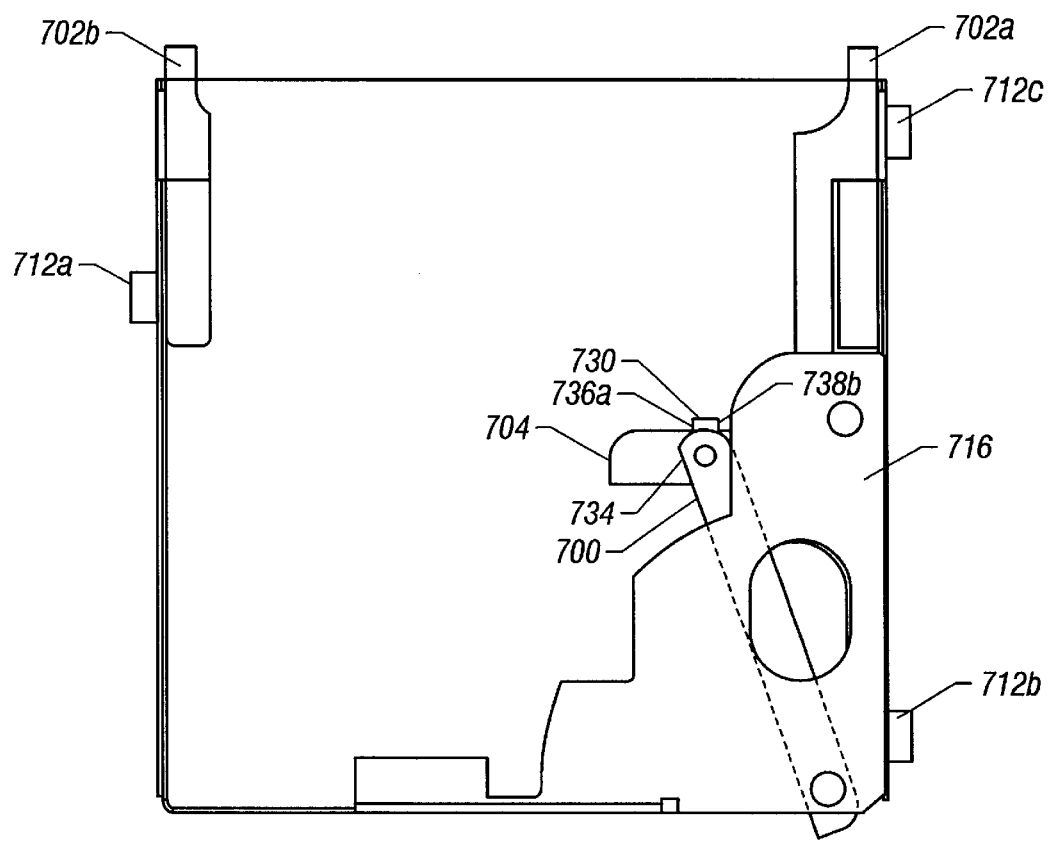
FIG. 12 is a plan view of the drawer assembly of FIG. 11.
Figure 13:
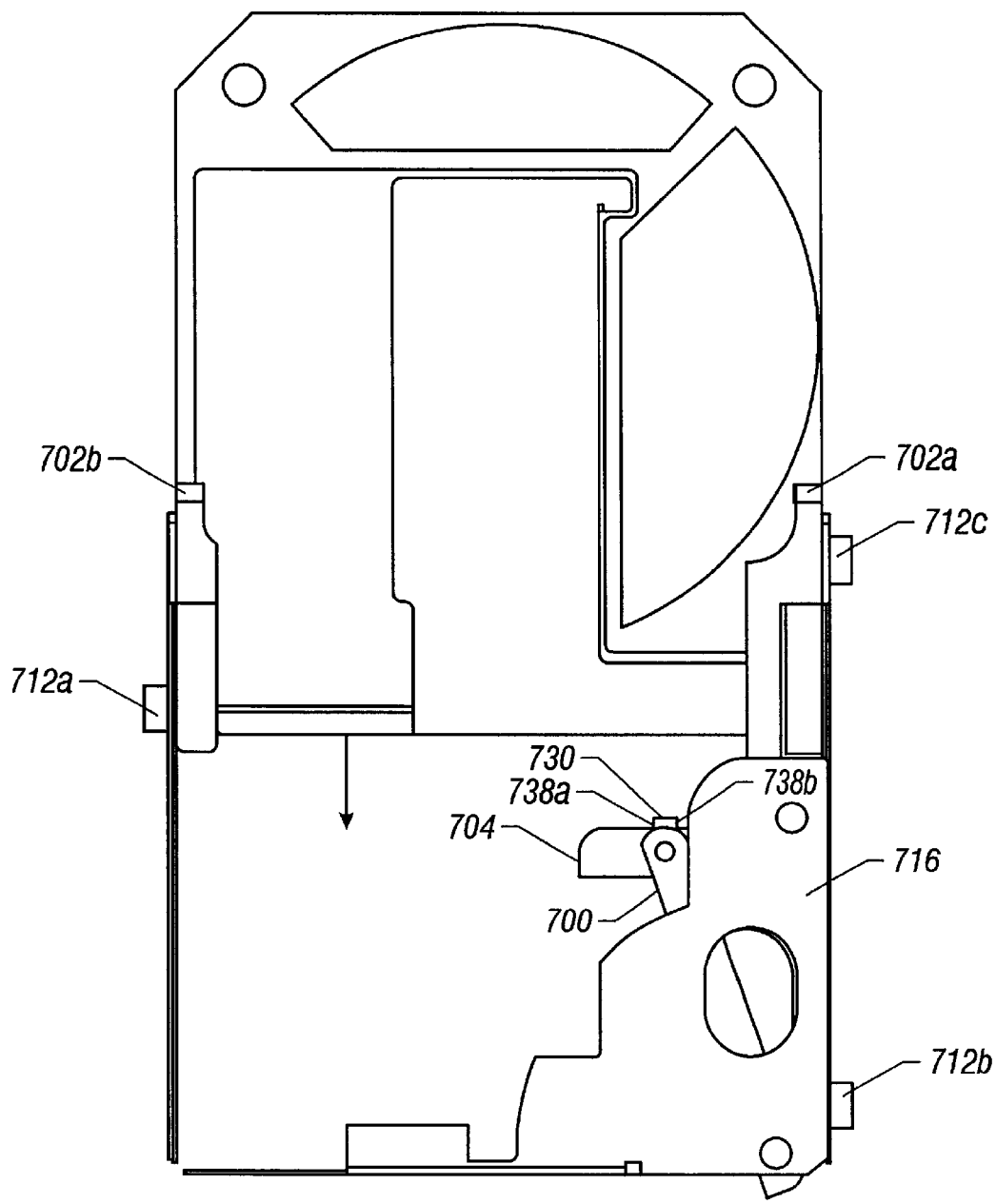
FIG. 13 is a plan view of the cartridge assembly being inserted into the drawer assembly.
Figure 14:
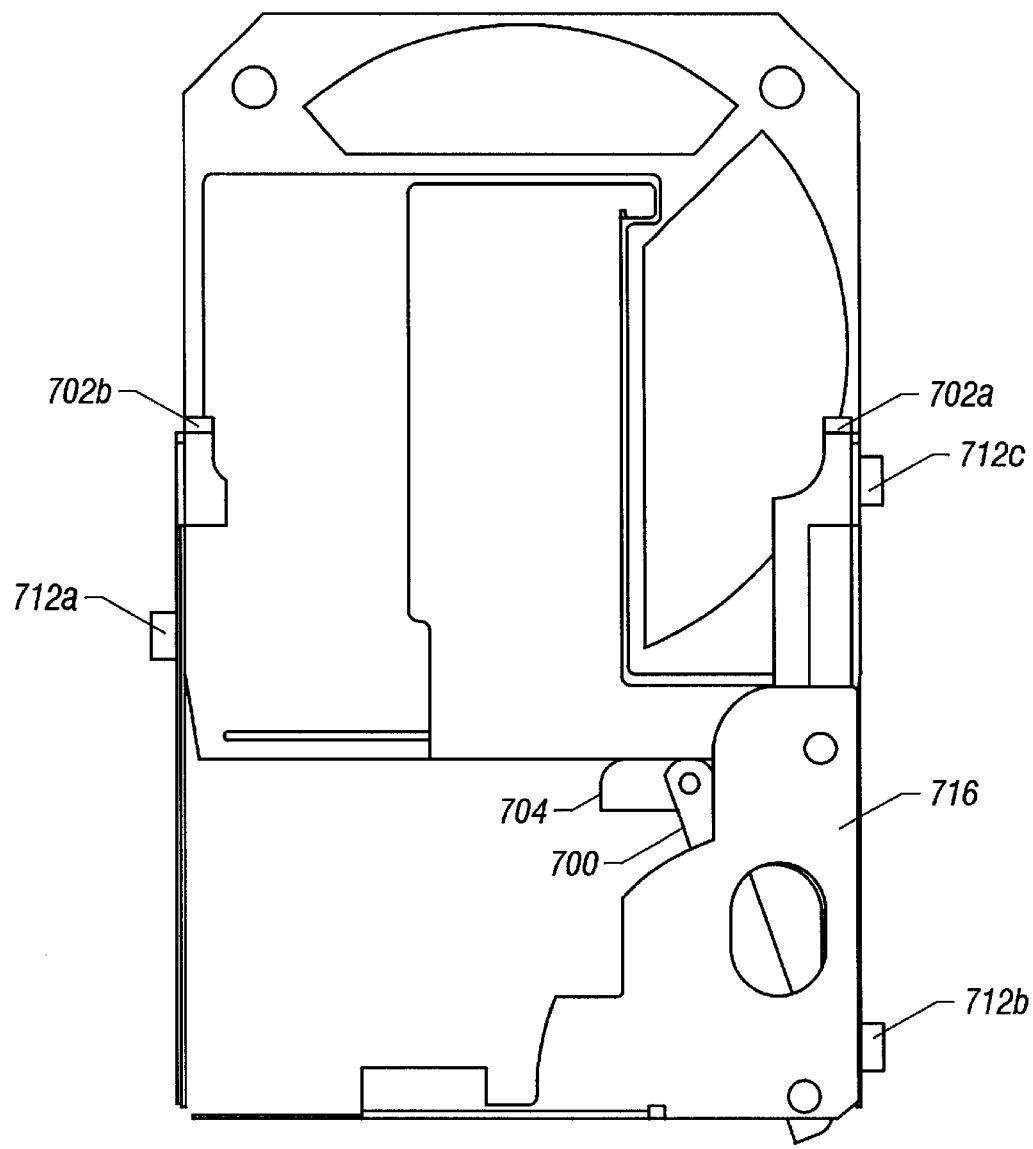
FIG. 14 is a another plan view of the cartridge assembly being inserted into the drawer assembly.
Figure 15:
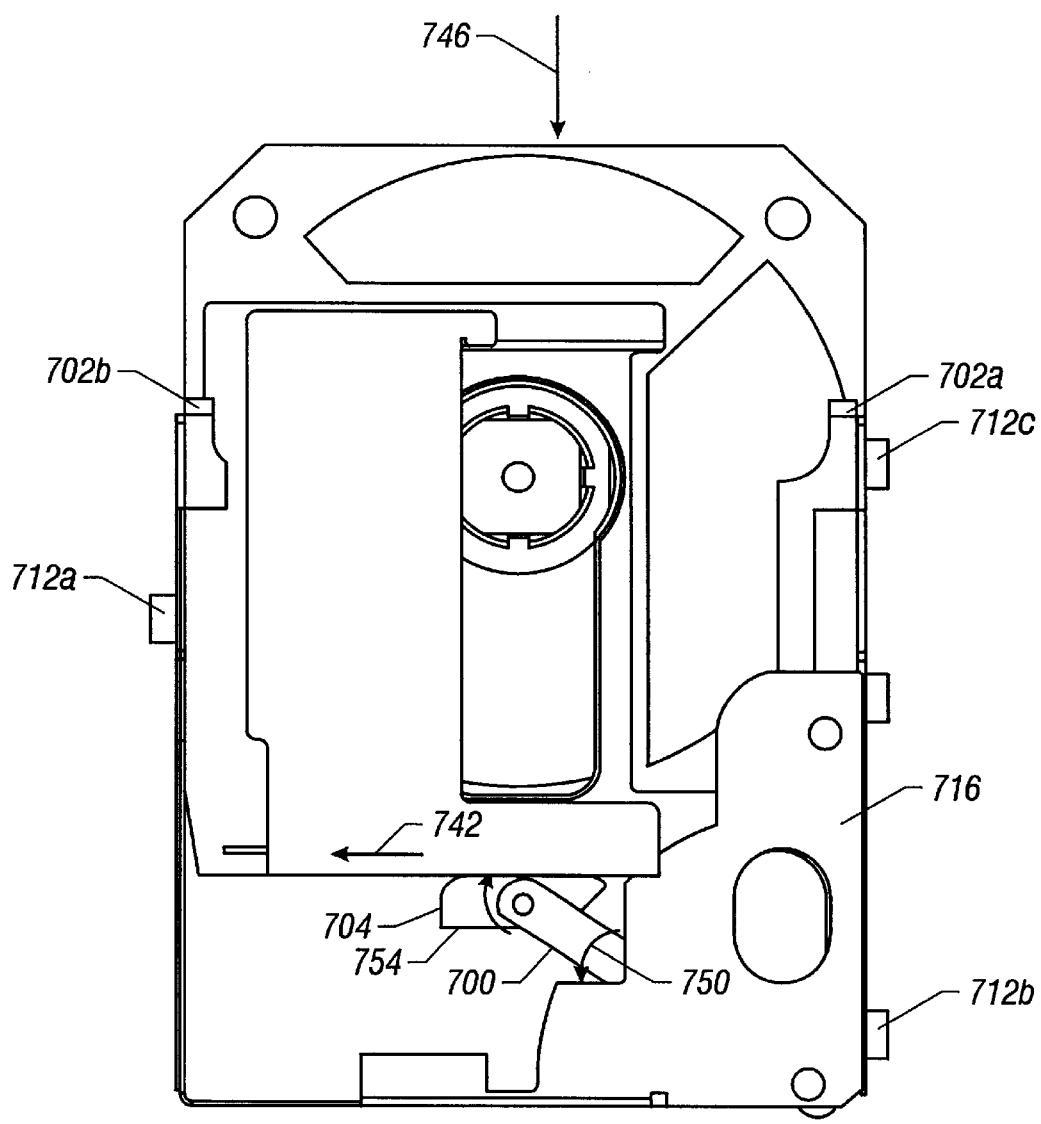
FIG. 15 is a another plan view of the cartridge assembly being inserted into the drawer assembly.
Figure 16A:
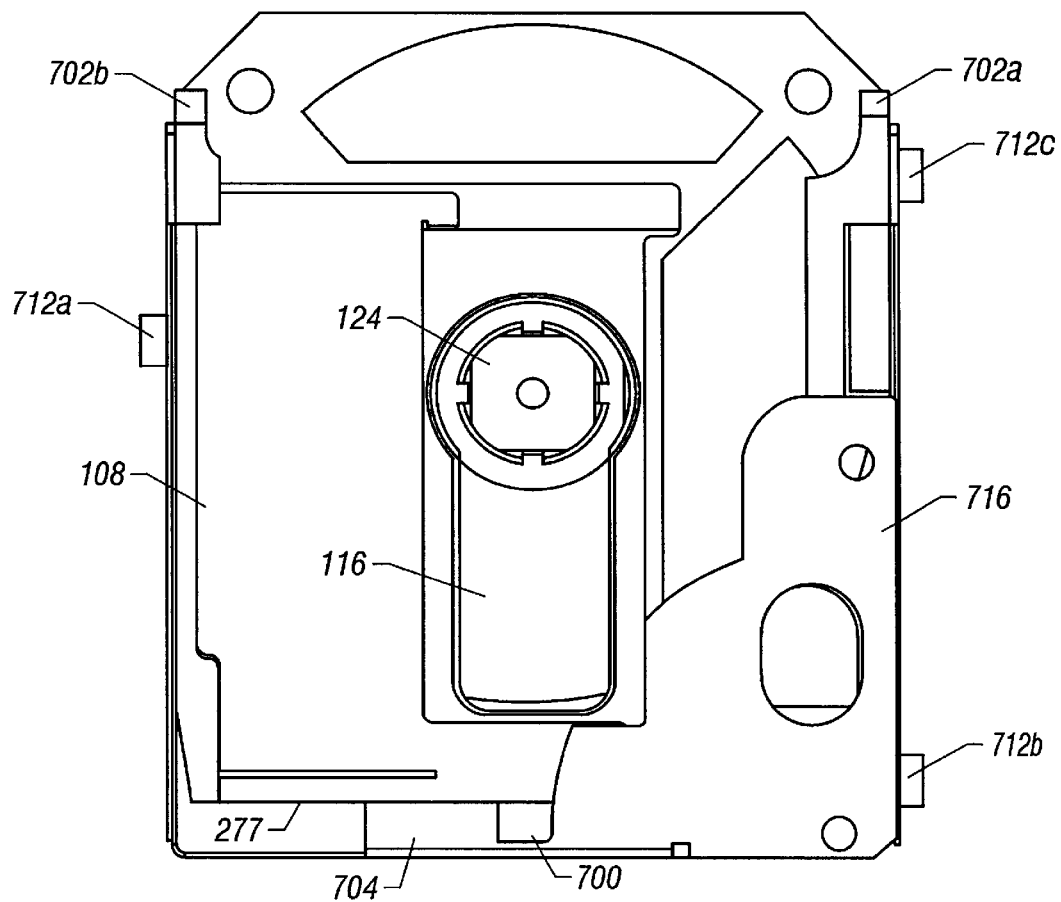
FIGS. 16A and B are more plan views of the cartridge assembly being inserted into the drawer assembly, with FIG. 16B having the cover removed to better illustrate the rotary arm and locking plate.
Figure 16B:
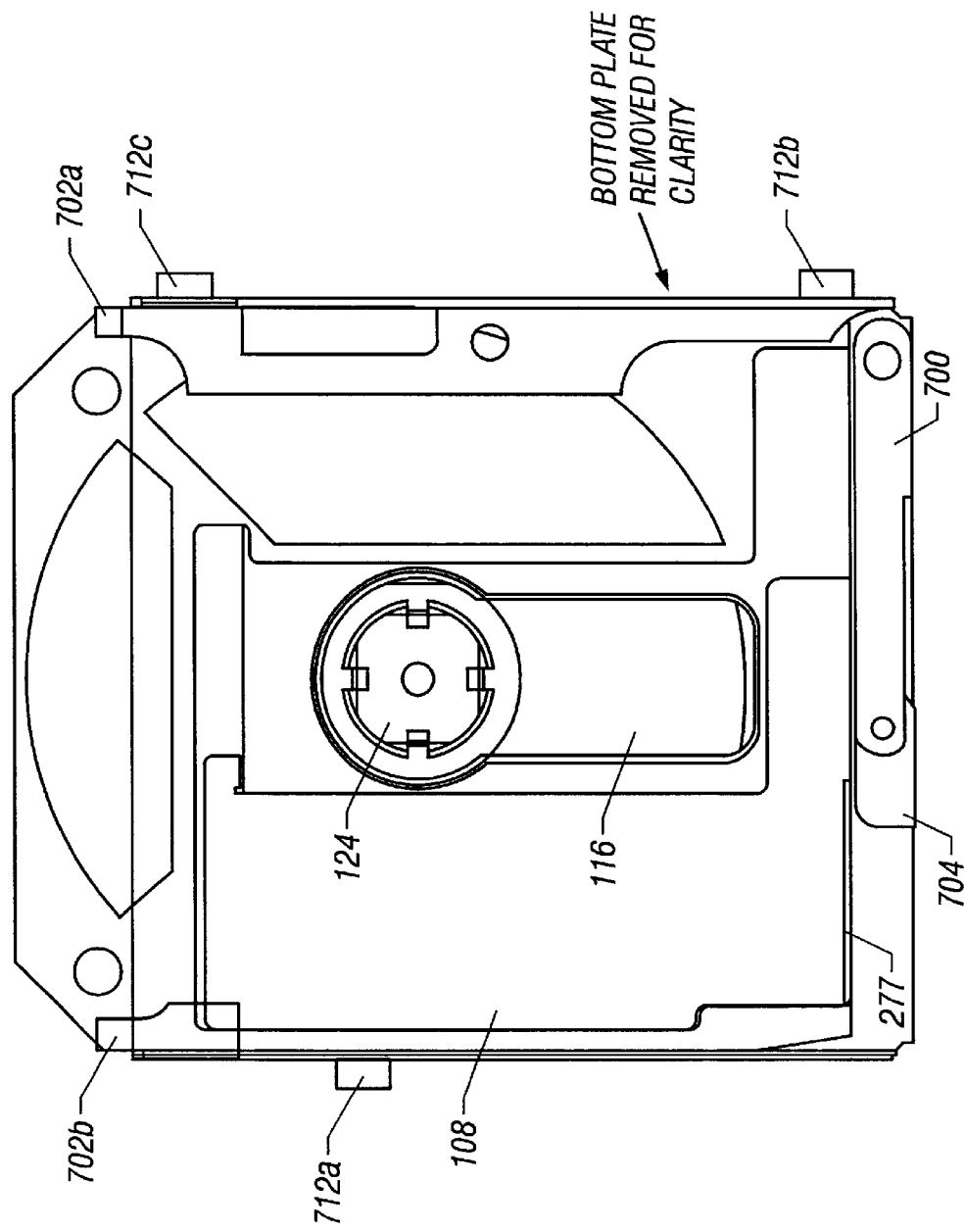
Figure 17:
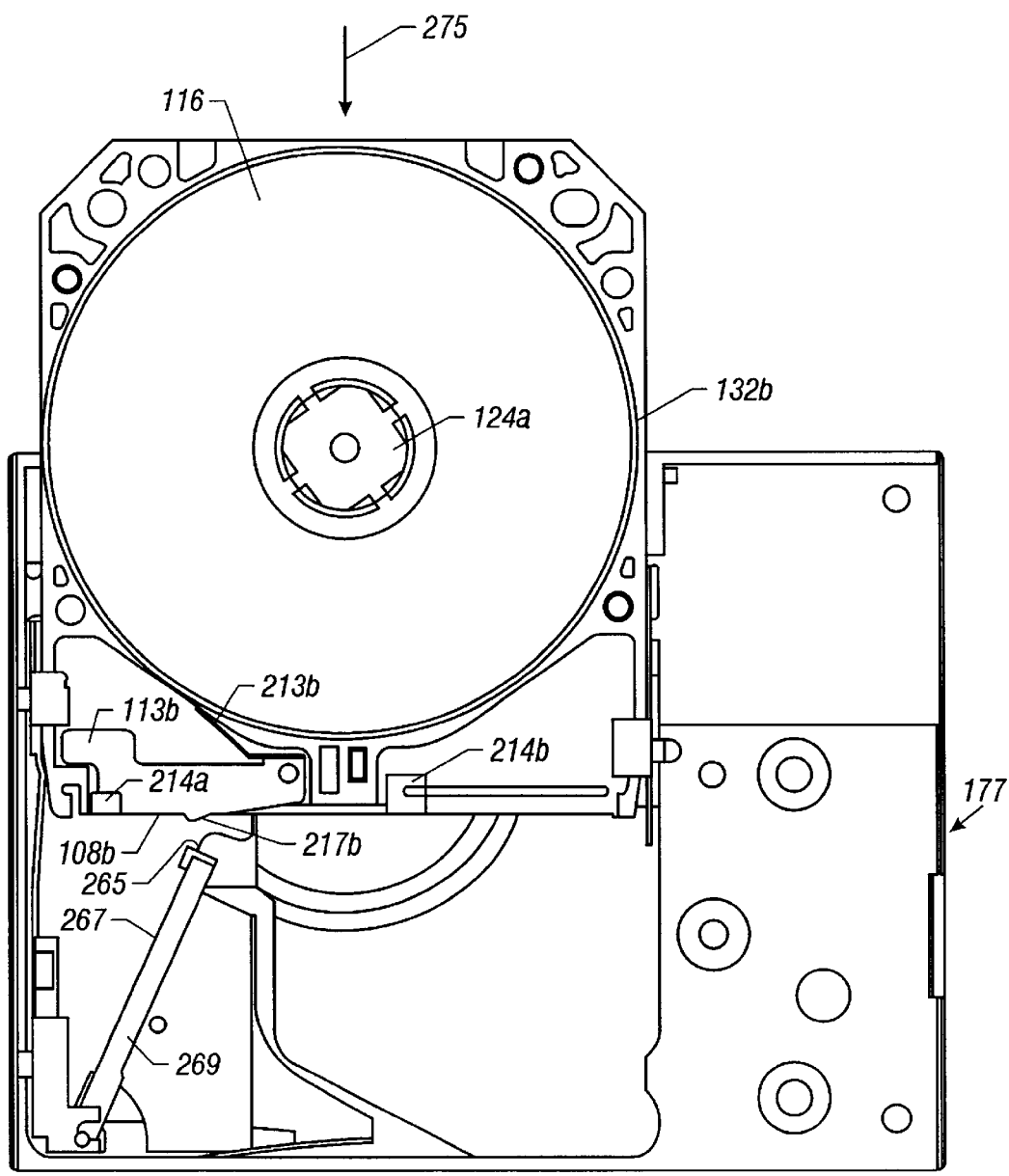
FIG. 17 is a top sectional view taken along line 8—8 of FIG. 5 when the cartridge assembly is being inserted properly into a disk drive according to another embodiment of the present invention.

Operation of the locking subassembly and the shutter member will be discussed with reference to FIGS. 8–16B. When the shutter member 108a,b is in the locked and closed position (FIG. 7), the locking nub 217a,b projects into the locking slot 234a,b and the spring member 215a,b is in an uncompressed (or slightly compressed) state. The cartridge assembly 100 is inserted into the disk drive 177 as shown in the sequence of FIGS. 12–16. As the cartridge assembly 100 moves into the disk drive 177, an unlocking nub 730 rotatably positioned on a distal end 734 of the rotary arm 700 engages the locking nub 217a,b (FIG. 14). As the user continues to push the cartridge assembly 100 into the disk drive 177, the unlocking nub 730 displaces the locking nub 217b inwardly (and rotates the locking arm 113a,b) until the locking nub 217b is disengaged from (and the unlocking nub 730 engages) the locking slot 234a,b and the shutter member 108a,b is in the unlocked and movable position (FIGS. 9 and 14). In response the spring member 215a,b exerts a resistive force (by being forced against bearing surface or wall 236a,b) against displacement of the locking arm 113a,b by the rotary arm 700. The stepped front surfaces 738a,b of the unlocking nub 730 hooks the locking slot 234a,b and displaces the shutter member 108a,b laterally in direction 742 as shown in FIG. 15. In response to the insertion force 746 against the cartridge assembly 100, the rotary arm 700 rotates in a counterclockwise direction 750 and the locking plate rotates in a clockwise direction 754 (relative to the rotary arm) and displaces the shutter member to the fully open and unlocked position (FIGS. 10, 16A and B, and 22–23). The rotary arm 700 causes the leading edge 263a,b of the shutter member 108a,b to engage the similarly shaped raised edge 264a,b of the housing member 104b (FIG. 16). In the open position, the rotary arm is substantially aligned with (or parallel to) the planar front face 277 of the cartridge assembly 100 and the front face of the shutter member 108a,b (FIG. 16). The locking arm 113a,b is returned to its original (starting) position by the bias of the spring member 215a,b (FIG. 10).

When the user ejects the cartridge assembly 100 from the disk drive 177 by a mechanical device (not shown), the cartridge assembly 100 is pushed out of the disk drive and/or drawer assembly, and the rotary arm 700 is laterally displaced in a clockwise direction until the shutter member 108 and locking arm 113a,b are returned to their original positions of FIG. 8. As will be appreciated, the inclined or cammed surface 281a,b (FIG. 10) of the locking arm 113a,b facilitates movement of the shutter member 108 over the locking nub 217a,b during this process. As the cartridge assembly 100 is removed from the disk drive 177 and the rotary arm 700 disengaged from the slot 234a,b, the locking plate forces the trailing edge 283a,b of the corresponding shutter member 108a,b to the closed position against the raised, inner step 262a,b of the housing member 104a,b (FIG. 1). As will be appreciated, the raised inner step 262 is shaped the same as the trailing edge 283a,b of the shutter member 108a,b. The spring member 215a,b then forces the locking nub 217a,b to engage the locking slot 234a,b and return the shutter member 108a,b to the locked and closed position. As will be appreciated, the stepped edge 280a,b of the locking arm 113a,b engages the edge of the slot 234a,b to prevent the shutter member 108a,b from being displaced during storage and/or handling.

Figure 18:
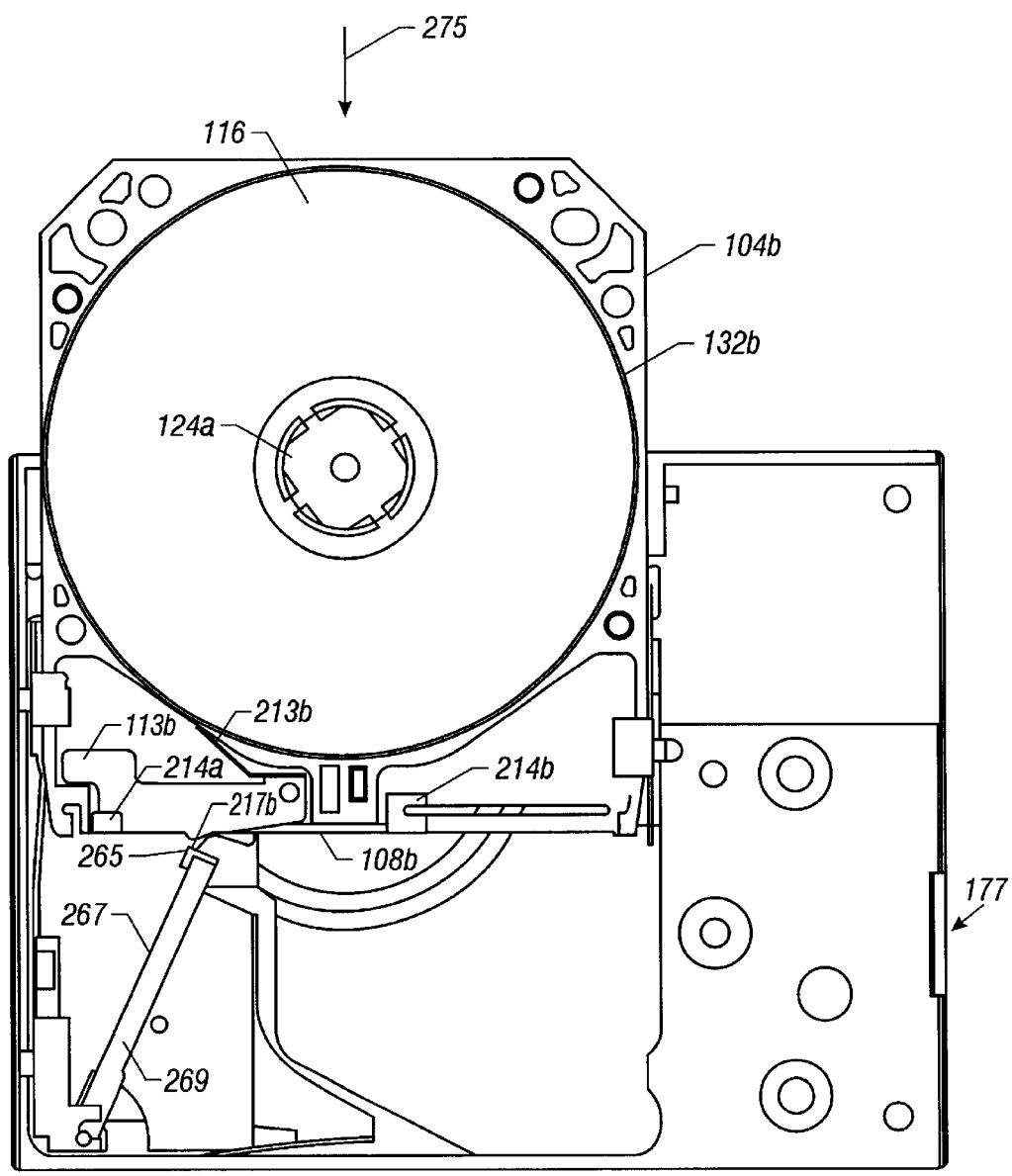
FIG. 18 is another top sectional view taken along line 8—8 of FIG. 5 when the cartridge assembly is being inserted properly into the disk drive of FIG. 17.
Figure 19:
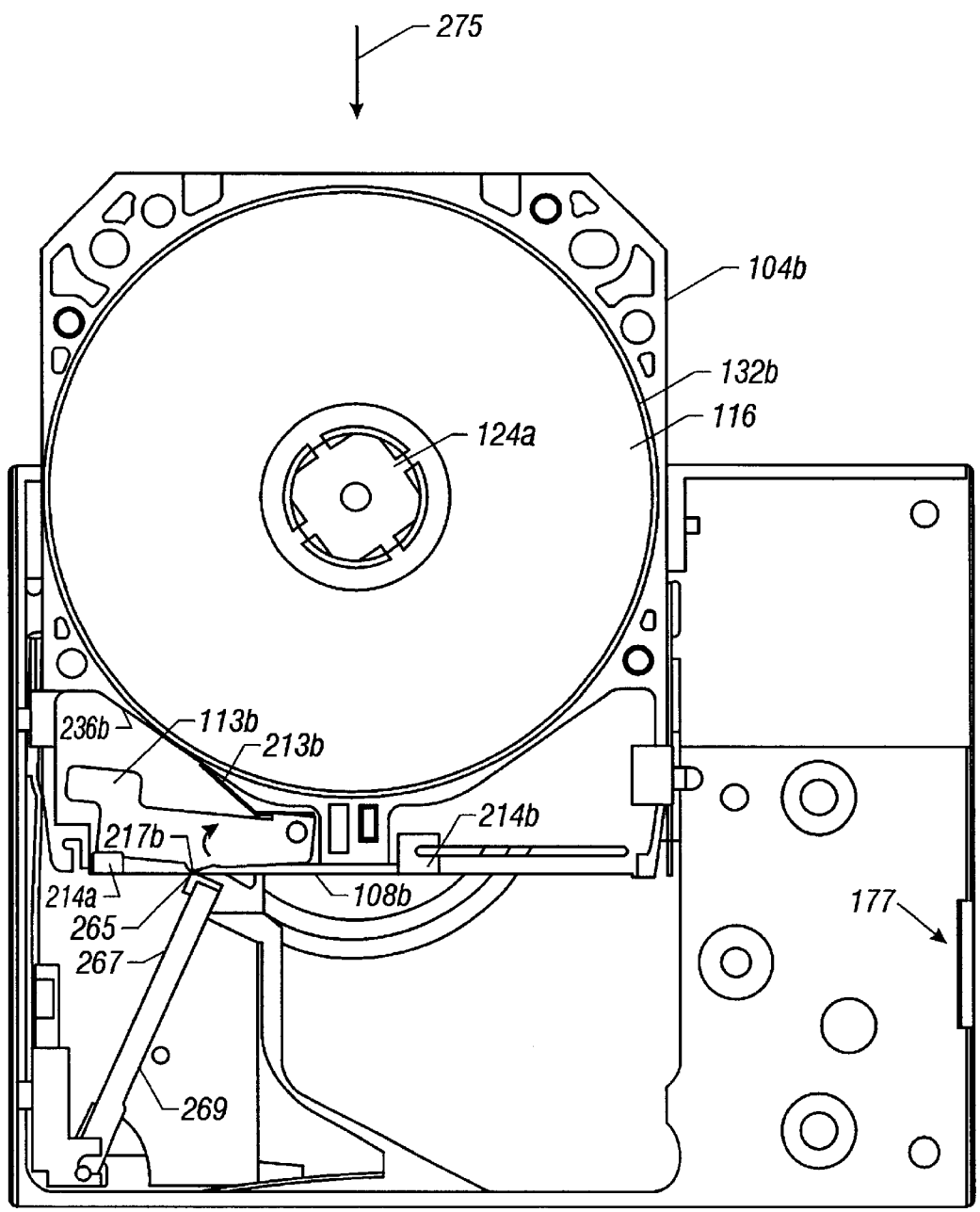
FIG. 19 is yet another top sectional view taken along line 8—8 of FIG. 5 when the cartridge assembly is being inserted properly into the disk drive of FIG. 17.
Figure 20:
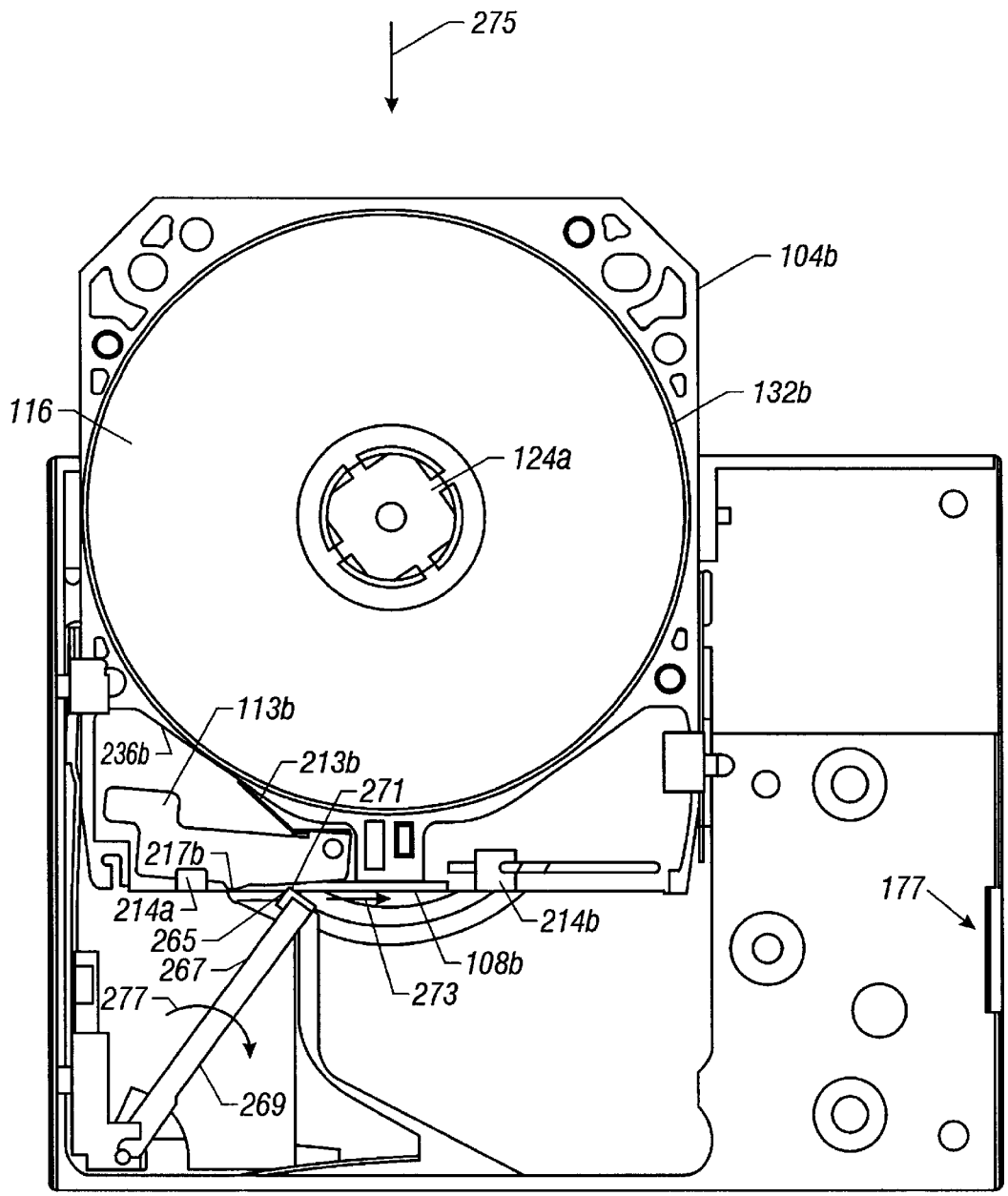
FIG. 20 is a further top sectional view taken along line 8—8 of FIG. 5 when the cartridge assembly is being inserted properly into the disk drive of FIG. 17.
Figure 21:
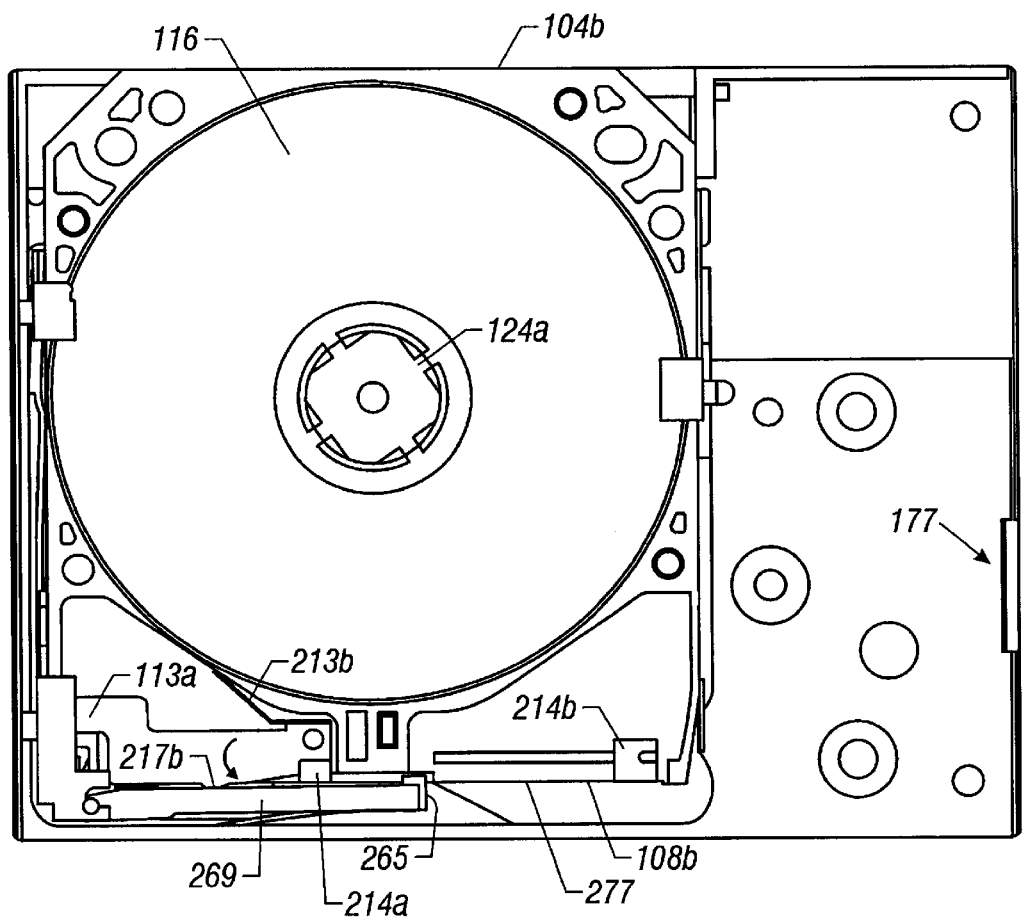
FIG. 21 is a further top sectional view taken along line 8—8 of FIG. 5 when the cartridge assembly is fully inserted and seated in the disk drive of FIG. 17.
Figure 22:
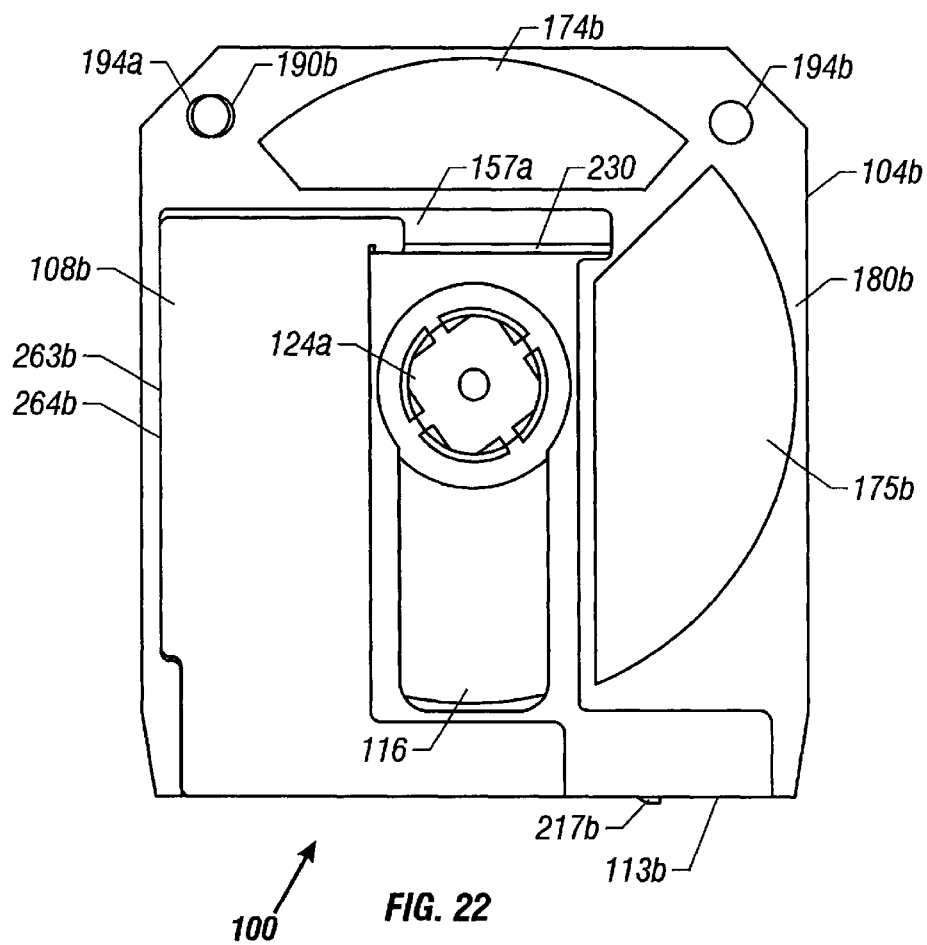
FIG. 22 is a bottom plan view of the cartridge assembly when the shutter member is in the fully open position.
Figure 23:
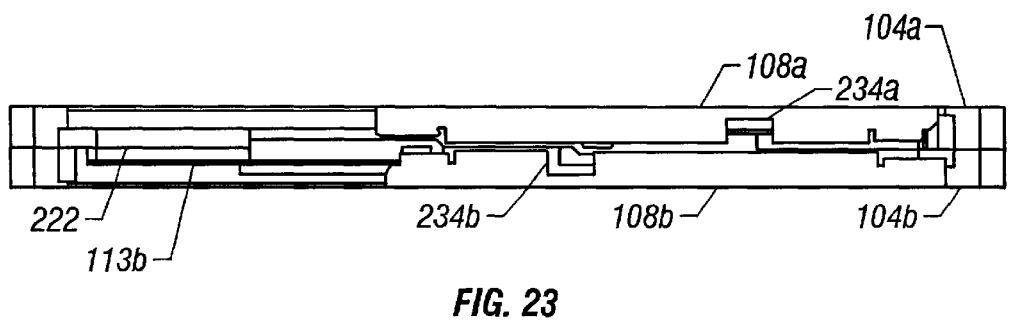
FIG. 23 is an end view of the cartridge assembly when a (lower) shutter member is in the open position.

Another embodiment of a cartridge unlocking assembly is shown in FIGS. 17–21. An unlocking nub 265, positioned on a distal end 267 of a rotary arm 269, engages the locking nub 217a,b (FIG. 18). As the user pushes the cartridge assembly 100 into the disk drive 177, the unlocking nub 267 displaces the locking nub 217b inwardly (and rotates the locking arm 113a,b) until the locking nub 217b is disengaged from the locking slot 234a,b and the shutter member 108a,b is in the unlocked and movable position (FIG. 19). In response the spring member 215a,b exerts a resistive force (by being forced against bearing surface 236a,b) against displacement of the locking arm 113a,b by the rotary arm 269. The stepped front surface 271 of the unlocking nub 265 hooks the locking slot 234a,b and displaces the shutter member 108a,b laterally in direction 237 as shown in FIG. 20. In response to the insertion force 275 against the cartridge assembly 100, the rotary arm 269 rotates in a clockwise direction 277 against the force of the spring member 112a,b and displaces the shutter member to the fully open and unlocked position (FIG. 20). The rotary arm 269 causes the leading edge 263a,b of the shutter member 108a,b to engage the similarly shaped raised edge 264a,b of the housing member 104b (FIG. 21). In the open position, the rotary arm is substantially aligned with (or parallel to) the planar front face 277 of the cartridge assembly 100 and the front face of the shutter member 108a,b (FIG. 21).

The shutter member 108a,b, when in the closed and locked position, protects the medium 116 from damage and seals the cartridge interior from foreign debris. Referring to FIG. 1, the shutter member 108a,b extends from a front (or loading) end 270 of the cartridge assembly 100 to a point on the other side of the hub assembly 106. The flexible shutter member 108 contacts the hub member 124 while avoiding contact with the medium 116 when flexed inwardly, i.e. when the shutter member 108a,b is moved towards the hub member(s) 124a,b. Additional structural support is provided to the shutter member by the end portions 274a,b and the peripheral side portions 278a,b of each shutter member 108a,b. These overlap and engage the indented surface 157 of the housing member adjacent to the opening 120a,b and window 128a,b when the shutter member 108a,b is displaced inwardly. In this manner, the shutter member acts as a load bearing member that provides additional protection to the medium 116 by resisting compression of the cartridge wall (e.g. by a user). The positioning of the shutter member 108a,b over the hub member further closes the opening and windows and thereby inhibits the entry of foreign matter, such as dust, into the interior of the cartridge.

The shutter members and housing members 108a,b and 104a,b can be composed of the same or different materials. In one configuration, the shutter members are metal (e.g., stainless steel) and the housing members are plastic (e.g., polycarbonate). In this configuration, the shutter members thus have greater yield and tensile strengths than the housing members.

Referring to FIGS. 26–29, alignment of the cartridge assembly 100 in the disk drive 177 will now be described. As will be appreciated, to facilitate alignment of the medium 116 in the disk drive 177, it is necessary to first properly spatially align the cartridge assembly 100 in the drive 177.

Referring to FIGS. 26–29, cartridge assembly alignment is performed in the X and Y directions using anti-rotational slots 190a,b and locating holes 194a,b formed in each housing member 104a,b. These engage an anti-rotational pin 198 and locating pin 202, respectively. Specifically, anti-rotational slot 190a is aligned with the locating hole 194b and the locating hole 194a is aligned with the anti-rotational slot 190b to permit the cartridge to be flipped in the disk drive depending upon which operational surface 148a,b of the double-sided medium 116 is to be accessed. Depending on which side of the medium 116 is to be accessed, one of the anti-rotational slots 190a,b will receive the anti-rotational pin 198 and one of the locating holes 194a,b will receive the locating pin 202. The combination of the anti-rotational slot and locating hole and related pins permits the disk drive to rotate the housing members slightly about the locating pin to provide proper alignment of the housing members in the disk drive prior to or simultaneous with alignment of the medium and attached hub assembly. When the cartridge housing is properly aligned, the disk drive is able to freely rotate the medium without interference form the cartridge housing. As will be appreciated, the anti-rotational slot and pin together inhibit unwanted or excessive rotation of the cartridge assembly about the locating hole and pin as too much displacement of the cartridge can be detrimental to centering of the disk on the disk drive spindle and to servo control.

Figure 27:
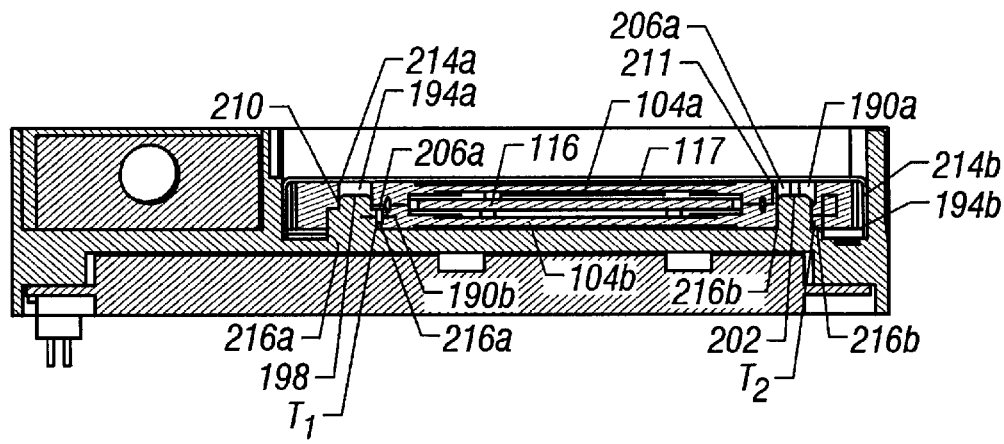
FIG. 27 is a cross-sectional view taken along lines 27—27 of FIG. 26 (with the cartridge assembly in position on the disk drive spindle)

Referring to FIG. 27, the clearance "$T_1$", between the interior walls 206a,b of the slots 190a,b and the outer wall 210 of the anti-rotational pin 198, is greater than the clearance "$T_2$", between the interior wall 214a,b of the locating hole 194a,b and the outer wall 211 of the locating pin 202, to permit the cartridge assembly to engage the anti-rotational pin. In one configuration, the diameters of the anti-rotational and locating pins 198 and 202 are substantially the same and the length of each of the anti-rotational slots 190a,b is greater (i.e., at least about 25% but not more than about 50% more) than each of the diameters of the locating holes 194a,b. The pins 198 and 202 are radially chamfered and/or bullet-nosed to facilitate insertion of the pins into the anti-rotational slot and locating hole respectively. The pins are located at the corners of the cartridge assembly as there is a sufficient cartridge wall thickness at the corners to support the pins.

Cartridge assembly alignment in the Z direction is performed by means of the engagement of shoulders 216a,b,c with the raised outer wall portions 180a,b (FIG. 1) of the housing member (depending on which housing member is facing the shoulders). The annular shoulders 216a,b are adjacent to the anti-rotational and locating pins 198 and 202, respectively, while the shoulder 216c is not associated with any pin. The shoulders 216a–c contact the wall portions 180a,b due to the downward force of a spring located above the housing member 104a (not shown), such as a leaf spring, on the opposite housing member 104a when housing member 104b engages the shoulders. As will be appreciated, only three shoulders are required to perform the alignment even though a system can use four or more such shoulders to contact the wall portions 180a,b of the members 104a,b. When the cartridge assembly is properly positioned in the disk drive, the medium 116 and attached hub assembly 106 are free to rotate in the cartridge assembly. The shoulders or datum features provide a highly efficient method for positioning the cartridge assembly without distortion of the medium 116 such as by clamping.

Through proper alignment of the cartridge housing, the disk drive components are able to further align the medium. A central bore 290 in the hub assembly 106 engages a spindle 291 on the disk drive spin motor 292 to align the medium 116 in the x-y directions and an annular ring 293 engages the operational surface 148b of the medium 116 to provide alignment in the Z direction, thereby providing proper servo and focus control. A rotary actuator 293 radially moves the optical arm 294 to properly orient the optical head 206 mounted on the end of the arm relative to the operational surface 148b of the medium 116. A sleeve 117 mounted in the disk drive receives the cartridge assembly prior to or during insertion to facilitate insertion and ejection of the cartridge assembly.

Figure 26:
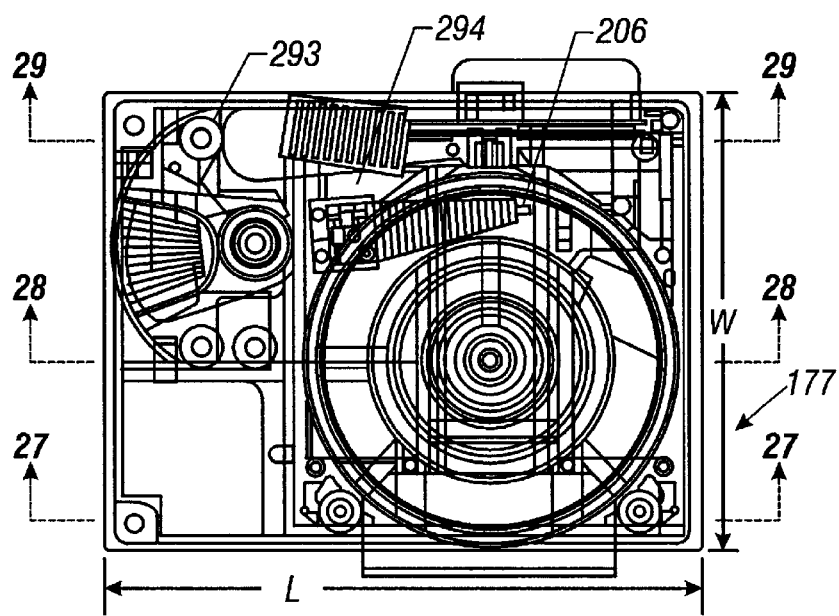
FIG. 26 is a top view of the cartridge assembly of FIG. 1 in a disk drive assembly.
Figure 28:
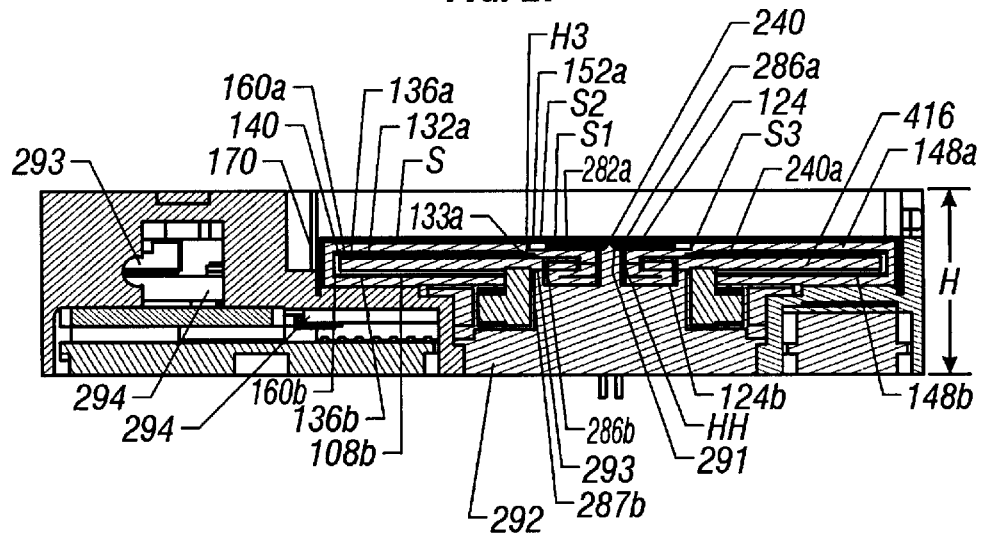
FIG. 28 is a cross-sectional view taken along line 28—28 of FIG. 26 (with the cartridge assembly in position on the disk drive spindle)
Figure 29:
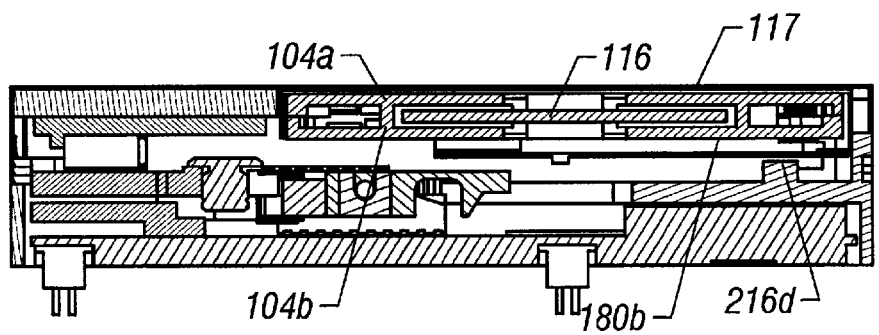
FIG. 29 is a cross-sectional view taken along line 29—29 of FIG. 26 (immediately before the cartridge assembly is lowered into position on the disk drive spindle)

Referring to FIGS. 26 and 28, the form factor of the disk drive assembly 177 is relatively small. In one configuration, the disk drive assembly 177 has a height "H" ranging from about 10 to about 15 mm, a width "W" ranging from about 35 to about 55 mm, and a length "L" ranging from about 30 to about 50 mm.

Referring again to FIGS. 27–29, the spatial relationships among the hub assembly 106, medium 116, and components of the cartridge assembly 100 are depicted. As noted, an objective of the present invention is to provide a cartridge assembly that is compatible with the small form factor optical disk drive 177. To make this possible, a number of issues design considerations typically are addressed.

First, the cartridge assembly height "H" (FIG. 3) is preferably substantially minimized. Second, the vertical displacement of the cartridge assembly in the "Z" direction is preferably substantially minimized. To realize a low loading "Z" distance, the exterior surface 180a,b of the cartridge assembly and exterior surface 800a,b of the corresponding shutter member 108a,b are typically coincident (or coplanar) (see FIG. 4). This relationship facilitates the ability of the shutter member to expose or cover the bore 290 in the hub assembly and the window 128. The exterior surface 180a,b of the housing members 104a,b and the adjacent shutter member exterior surface 800a,b must be inserted over the free end of the spindle 291 with a minimal, carefully controlled clearance in the "Z" direction for the straight-in insertion configuration of FIGS. 12–21. This clearance is typically no more than about 0.2 mm. To substantially minimize the loading displacement in the "Z" direction, the exterior surfaces 286a,b of the hub members are each preferably established in close proximity to the respective exterior surfaces 180a,b and 800a,b. Accordingly, the thickness of the shutter members is preferably substantially minimized (i.e., is no more than about 0.2 mm) and the hub height is substantially maximized, within the height "H" of the cartridge assembly 100.

Third, medium 116 displacement in the "Z" direction from a nominal starting position within the cartridge is preferably substantially minimized to assure that the hub assembly does not interfere with part of the shutter member during shutter member displacement in either direction (i.e., in shutter member opening or closing). The nominal starting position refers to the medium 116 position when the medium 116 is precisely centered in the annular slot 170. The medium 116 can translate or move in the "Z" direction internally in the cartridge assembly 100 in the presence of a gravitational or accelerating force. Referring to FIG. 25, the distance ($S_1$) from the interior surface 282a of the shutter member 108a to the exterior surface 152a of the hub member 124a is greater than the distance ($H_d$) between the outer surface of the medium 116 and the interior surface 132a of the first housing member 104a The width $H_2$ of the annular slot 170 is preferably minimized while being sufficiently large to assure that the medium 116 can rotate freely, without contacting any internal surface of the cartridge assembly 100 during medium rotation. The foregoing requirements typically require the height of the hub members (as measured from the operational surface 148 of the medium 116 to the maximum thickness point of the hub assembly or given by the equation 50% ($H_H$–T)) to be limited by about 50% of the cartridge thickness "H" reduced by the following: (a) 50% of the medium 116 thickness "T", (b) 50% of the width $H_2$ of the annular slot, (c) the shutter member thickness, and (d) manufacturing tolerances.

Figure 24:
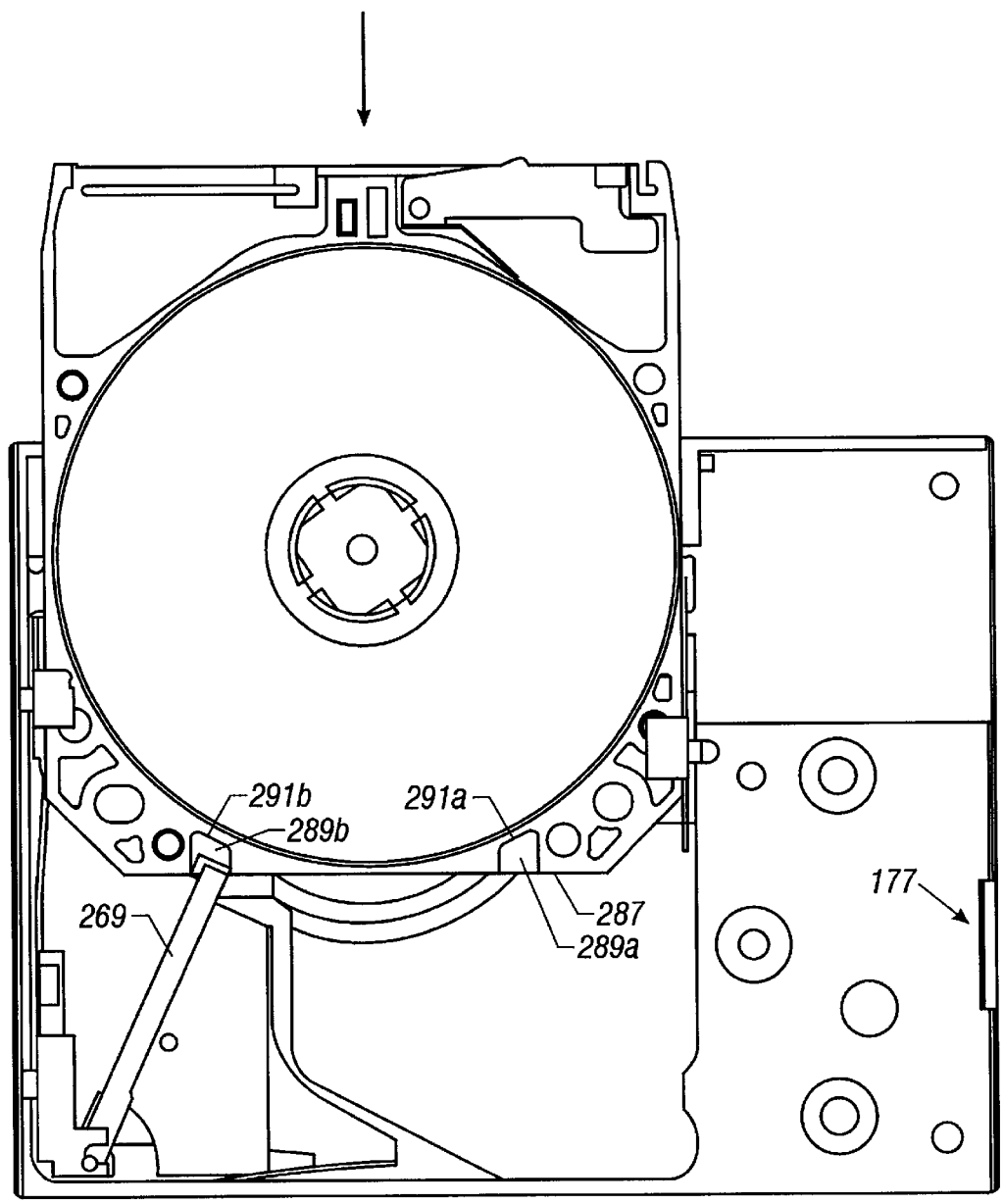
FIG. 24 is a top sectional view taken along line 8—8 of FIG. 5 when the cartridge assembly is being inserted improperly into a disk drive.

The cartridge assembly 100 can include a feature to prevent a user from inserting the cartridge assembly improperly into the disk drive and thereby damaging the disk drive, cartridge assembly, and/or disk or jamming the cartridge assembly in the disk drive. Referring to FIGS. 3 and 24, the rear end 287 of the cartridge assembly 100 includes one or more reverse lockout slots 289a,b which engage the rotary arm 269 as shown in FIG. 24 when the cartridge assembly 100 is inserted in a reverse (or incorrect) orientation into the drive 177. In this manner, the rotary arm 269 inhibits or restricts the distance of (improper) insertion of the cartridge into the disk drive, thereby protecting the disk drive and other components. The lockout slots 289a,b are positioned to engage the rotary arm 269 when the arm 269 is in a home or an at rest position (prior to rotational displacement of the arm by the cartridge assembly). The lockout slot 289a,b has an angled face 291a,b to accommodate the rotary arm 269 and prevent damage to the unlocking nub 265 during engagement.

Referring to FIGS. 2 and 6, the cartridge assembly 100 is manufactured by: placing the ends 300a,b of the spring members 112a,b in the corresponding spring guide slot 250a,b and the spring member in the space between the corresponding surfaces 254a,b and 258a,b; inserting each pin 261a,b into the corresponding hole 259a,b of the locking arm; inserting the tab 218a,b of each shutter member 108a,b in the tab opening 230a,b and the inwardly facing tabs 214a,b in the slots 222a,b; and placing the other end 300b of the spring members 300a,b into engagement with the corresponding indentation 215a,b in the tab 214b. These steps are repeated in the same order for the other housing member 104a,b. The tabs 218a,b are bent as shown in FIG. 7 and as described above. Next, the medium 116 is positioned such that the centers of the hub members 124a,b are roughly aligned with the center of the circular opening 120a,b in each housing member 104a,b. The housing members 104a,b are then joined together along a seam line 301 such as by ultrasonic welding, adhesion, ultraviolet techniques, tab-and-slot arrangements, and the like. Alternatively, clips or other suitable connectors can be used to join the housing members together.

Figure 30:
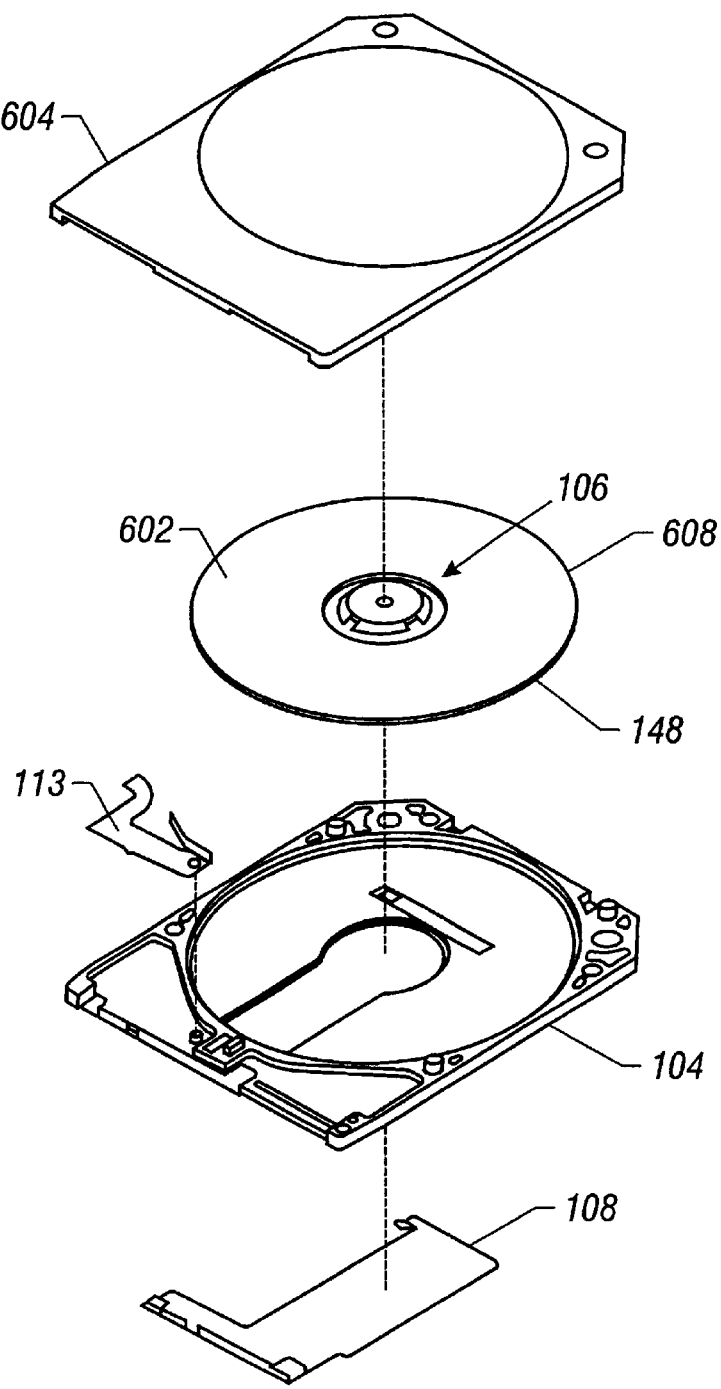
FIG. 30 is a disassembled view of a cartridge assembly according to another embodiment of the present invention.

FIG. 30 depicts an alternative embodiment of a cartridge assembly 600 for a single-sided disk 602 having only one information-containing or operational surface 148 and a blank or nonoperational surface 608. The one-half of the cartridge assembly 600 that is adjacent to surface 148 is the same as the embodiment set forth above. The other half of the cartridge assembly that is adjacent to surface 608 does not include a shutter, a locking arm, and a spring member. In this embodiment, the other housing member 604 of the cartridge assembly can be solid, with no window for to access the disk or circular opening for the hub assembly. The cartridge assembly is configured such that the cartridge assembly will not fit into the disk drive if the user attempts to insert the cartridge assembly upside down (i.e., with the nonoperational surface facing the optical head).

Figure 31:
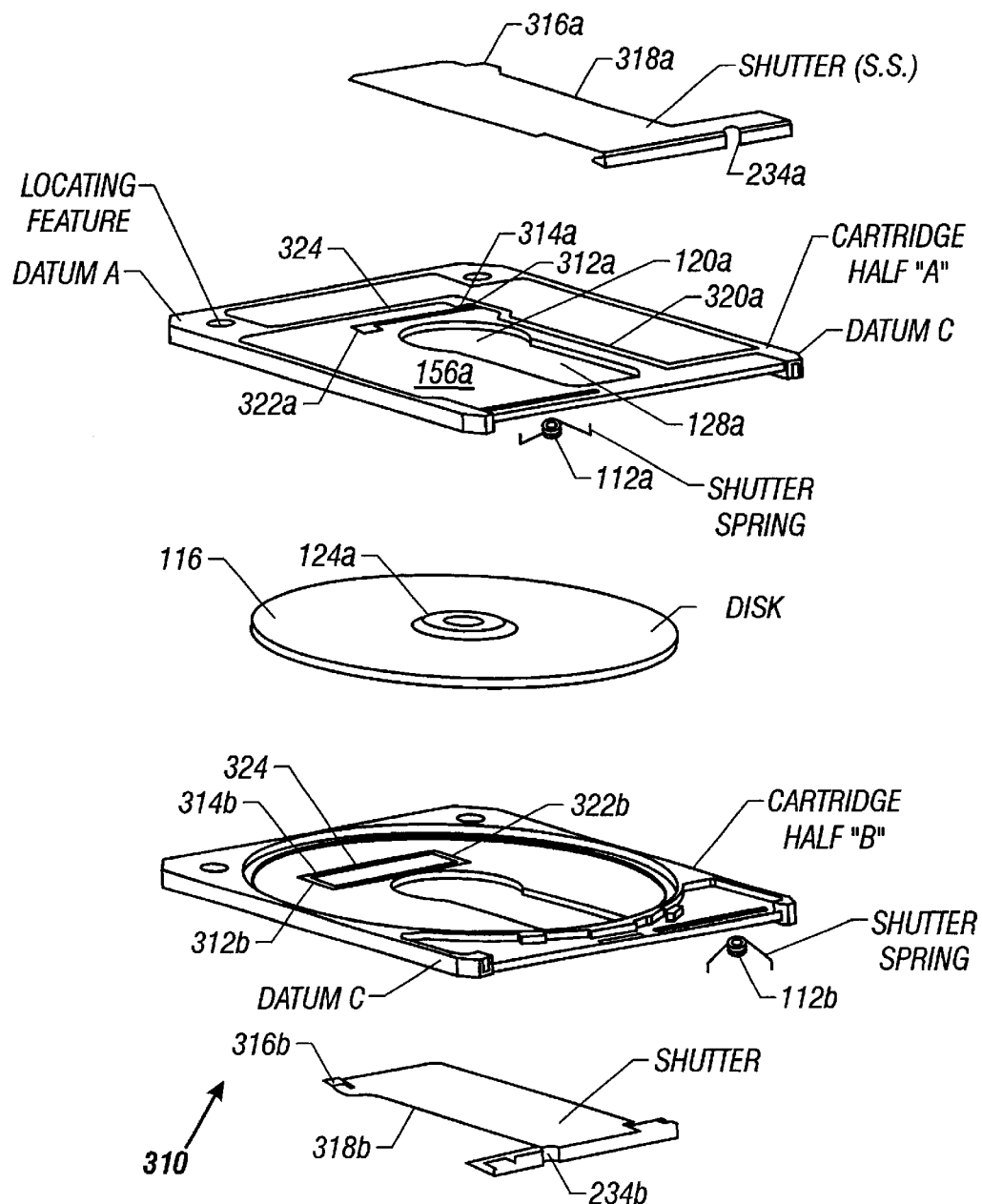
FIG. 31 is a disassembled view of a cartridge assembly according to another embodiment of the present invention.
Figure 32:
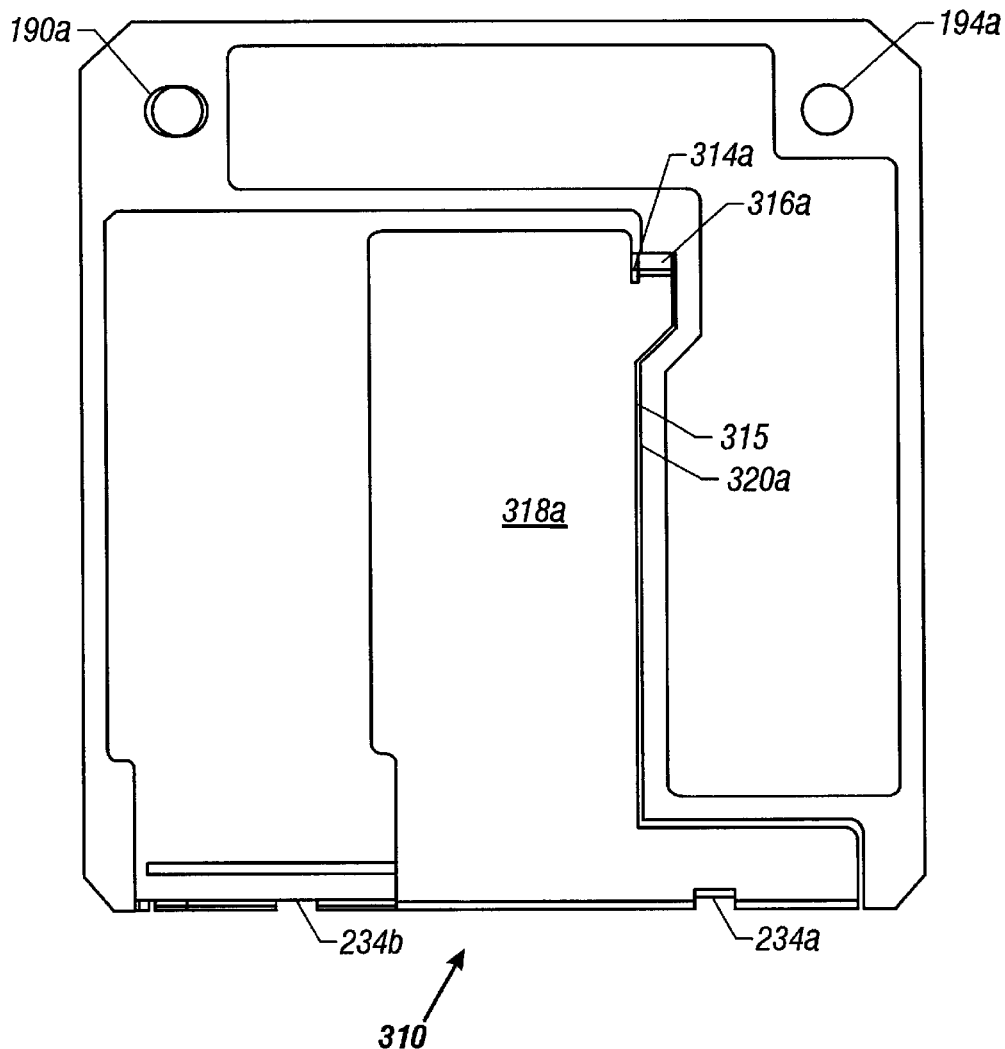
FIG. 32 is a top view of the cartridge assembly of FIG. 31 with the shutter in the closed and locked position.
Figure 33:
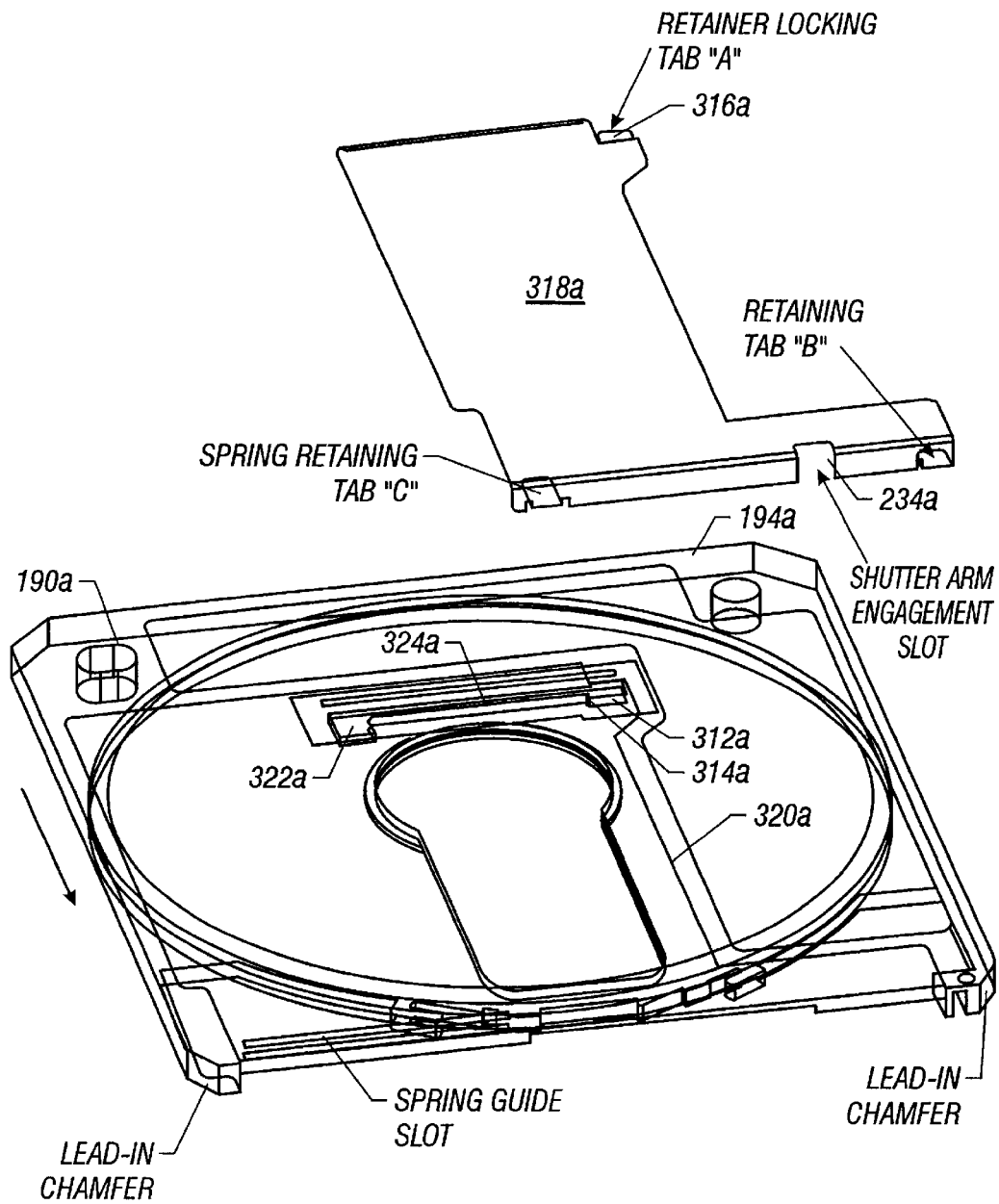
FIG. 33 is a partial disassembled view of first housing member and shutter member of the cartridge assembly of FIG. 31.

FIGS. 31–33 depict another embodiment of a cartridge assembly 310 that differs from the previous embodiment in the use of a different locking subassembly. The locking subassembly includes a locking slot 312a,b (and locking step 314a,b) that engages a tab 316 when the shutter member 318a,b is in the closed position. This subassembly does not include a locking arm. As will be appreciated, when the shutter member 318a,b is opened by the rotary arm, the rotary arm pushes the shutter member slightly inwardly to disengage the tab 316 from the locking step 314 and moves the tab 316 laterally out of and away from the locking slot 312. When the cartridge assembly 310 is removed from the disk drive and the rotary arm disengaged from the slot 234a,b, the spring member 112a,b forces the trailing edge 315 of the corresponding shutter member 318a,b to the closed position against the raised, inner step 320a,b of the housing member 314a,b and the tab 316 into the locking slot 312 and into engagement with the locking step 314. Another slot 322 is included at one end of the slot 324 (which permits lateral displacement of the tab 316) to permit the tab 316 to be placed into the engagement with the slot 324 (as shown in FIG. 33) during manufacture.

Figure 34:
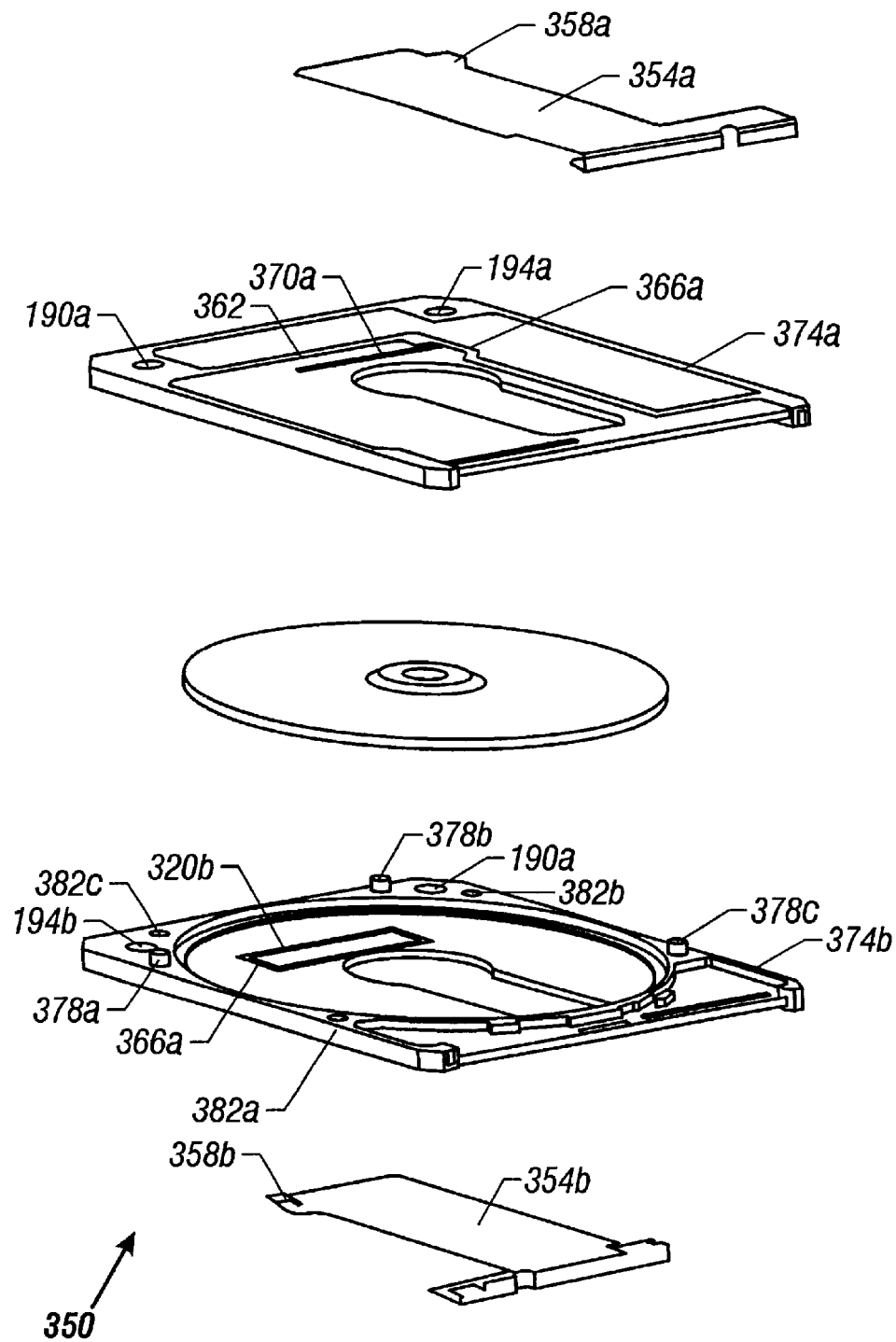
FIG. 34 is a disassembled view of a cartridge assembly according to a yet another embodiment of the invention.

FIG. 34 depicts yet another embodiment of a cartridge assembly. The cartridge assembly 350 is similar to the above embodiment with a number of exceptions. For example, the shutter members 354a,b include an inwardly facing tab 358a,b that differs from the outwardly facing tab 316a,b of the shutter members 318a,b. To accommodate the tab 358a,b, the slot 362a,b has a different configuration than the slot 324a,b (see e.g. FIG. 33) of the shutter members 318a,b. The slot 362a,b, however, also includes a locking slot 366a,b and step 370a,b. The first and second housing members 374a,b also include self-locating features, namely pins 378a–f and matching holes 382a–f to facilitate alignment of the housing members during manufacture. As will be appreciated, pins 378d–f and holes 382d–f are on the first housing member 374a and are therefore not shown.

Figure 35:
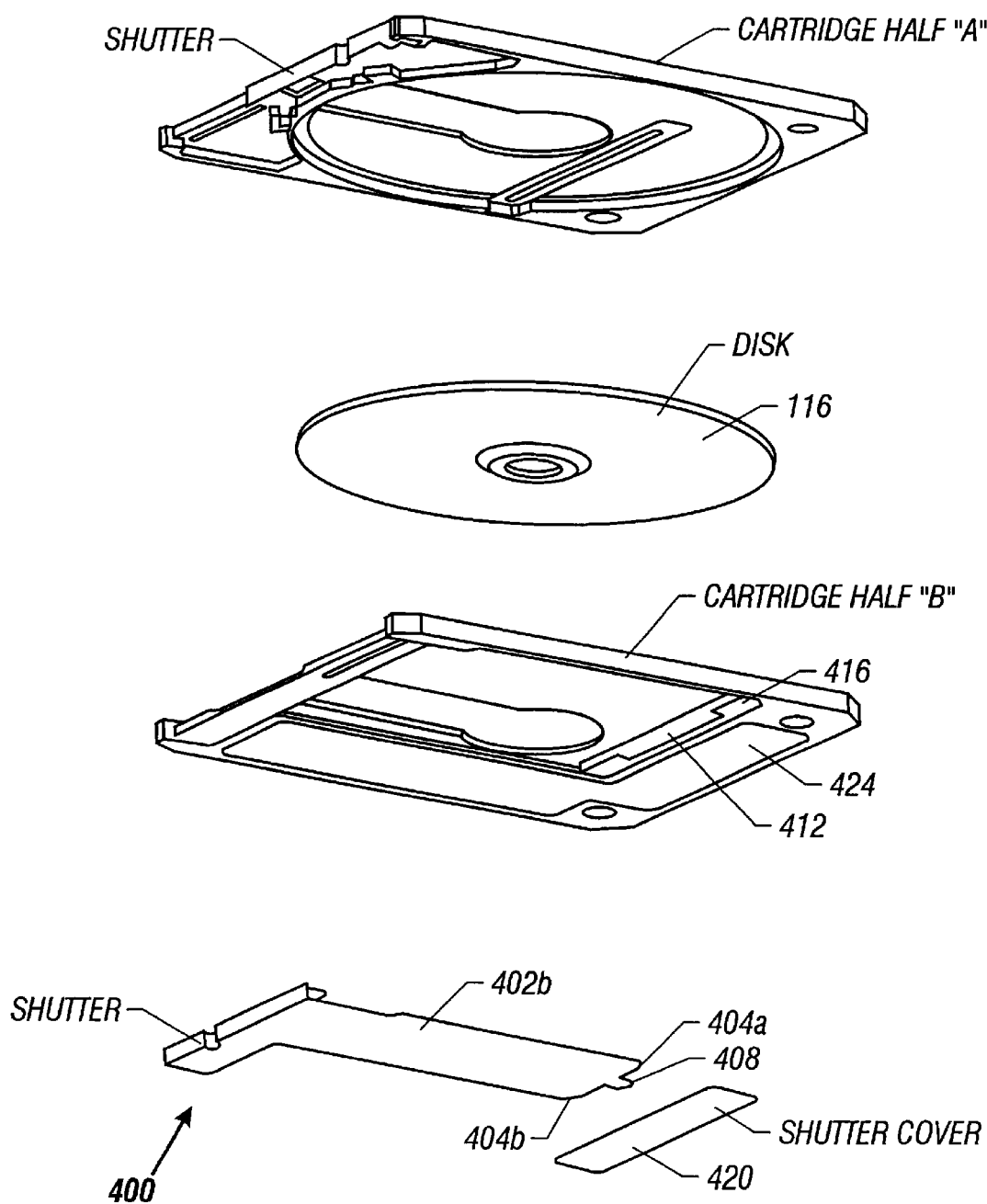
FIG. 35 is a disassembled view of cartridge assembly according to another embodiment of the present invention.
Figure 36:
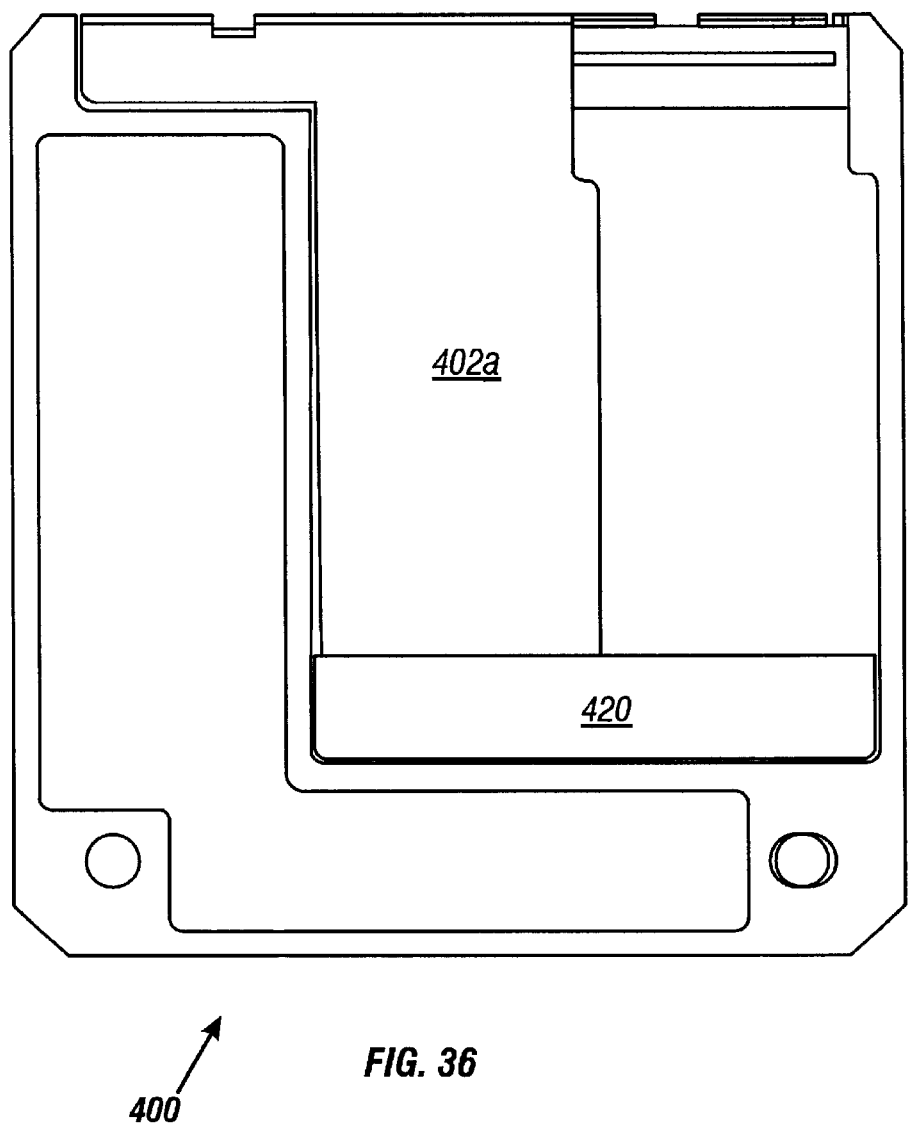
FIG. 36 is a top view of the cartridge assembly of FIG. 35 with the shutter in the closed and unlocked position.
Figure 37:
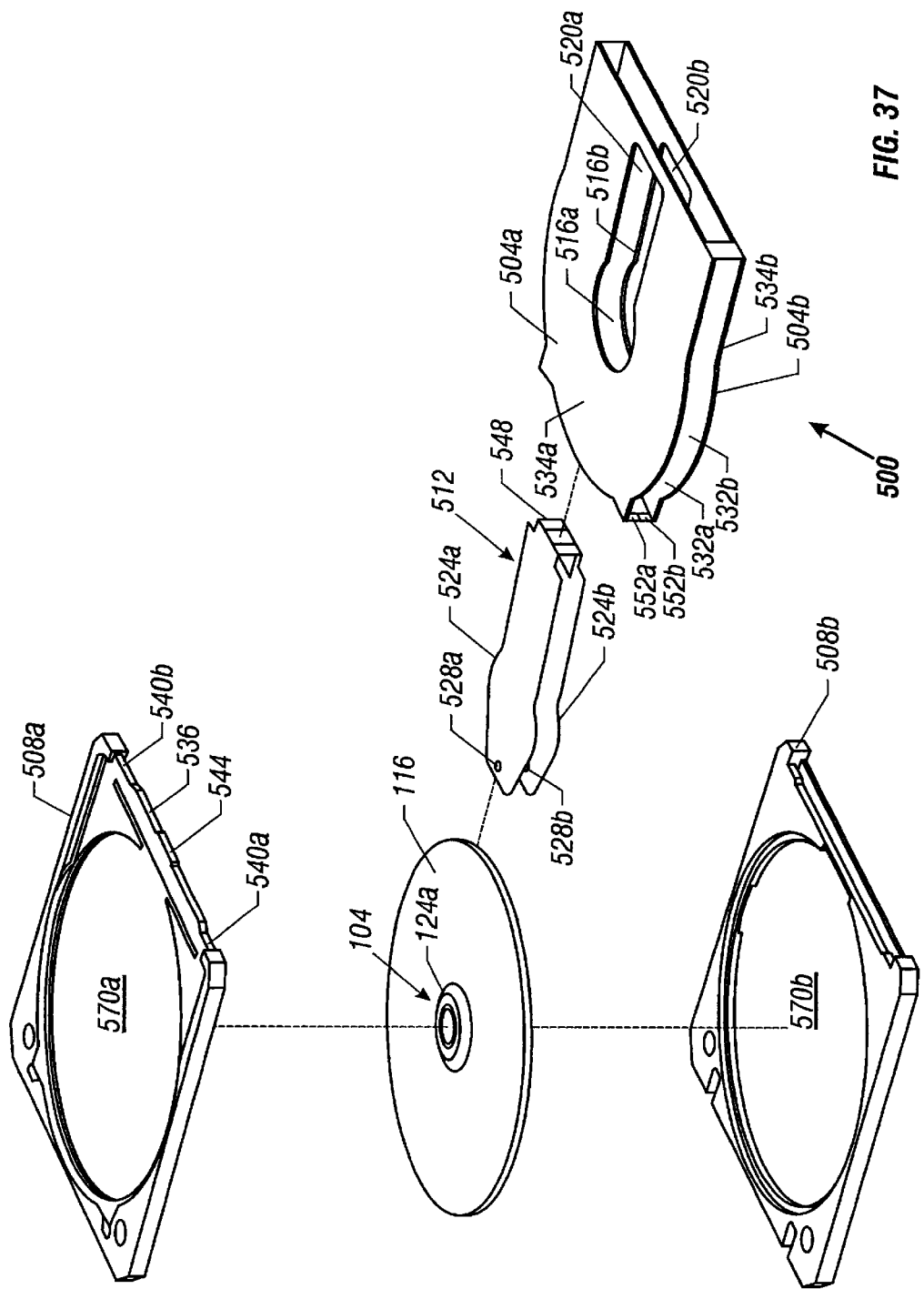
FIG. 37 is a disassembled view of a cartridge assembly according to yet another embodiment of the present invention prior to insertion in the cartridge assembly.

FIGS. 35–36 depict a further embodiment of a cartridge assembly 400 according to the present invention. The cartridge assembly 400 is similar to the above-noted embodiment of FIGS. 1–7 with a number of exceptions. The cartridge assembly 400 uses a shutter member 402a,b having projections 404a,b positioned on either side of a flat tab 408. The tab 408 rides in the slot 412, with the projections 404a,b engaging the step 416 to hold the shutter member in position during movement (and prevent the shutter member from becoming cocked to either side). A shutter cover 420 is fastened to the surface 424 and holds the tab 416 in the slot 412. The use of a slot that does not pass through the housing member as in the prior embodiment provides additional protection against the tab 408 contacting an operational surface of the medium. However, the use of the bent tab of FIG. 6 permits fewer parts to be used in cartridge assembly manufacture which lowers unit costs and a reduction of the overall cartridge height H with concomitant benefits in the form factor of the disk drive 177.

FIGS. 37–41 depict another embodiment of a cartridge assembly 500 that incorporates a unitary, metal (e.g., stainless steel) cover 504a,b on each of the housing members 508a,b. This embodiment provides additional structural support and a unitary, internal shutter 512 (e.g., stainless steel) for covering simultaneously the circular openings 516a,b and windows 520a,b from inside of each housing member 508a,b. This design is different from the two-piece shutter of the previous embodiments that are positioned outside of the housing members (i.e., are external shutters). Each arm 524a,b of the shutter has an outwardly facing dimple 528a,b that contacts the adjacent interior wall 532a,b of the adjacent metal cover 534a,b member and thereby reduces friction as the internal shutter 512 moves laterally inside of the cartridge between the open and closed positions. The metal covers are highly electrically conductive and thereby prevent the buildup of static electricity and the electrical attraction of charged particles by the cartridge assembly and also provide a higher strength than plastic for a given thickness.

Figure 38:
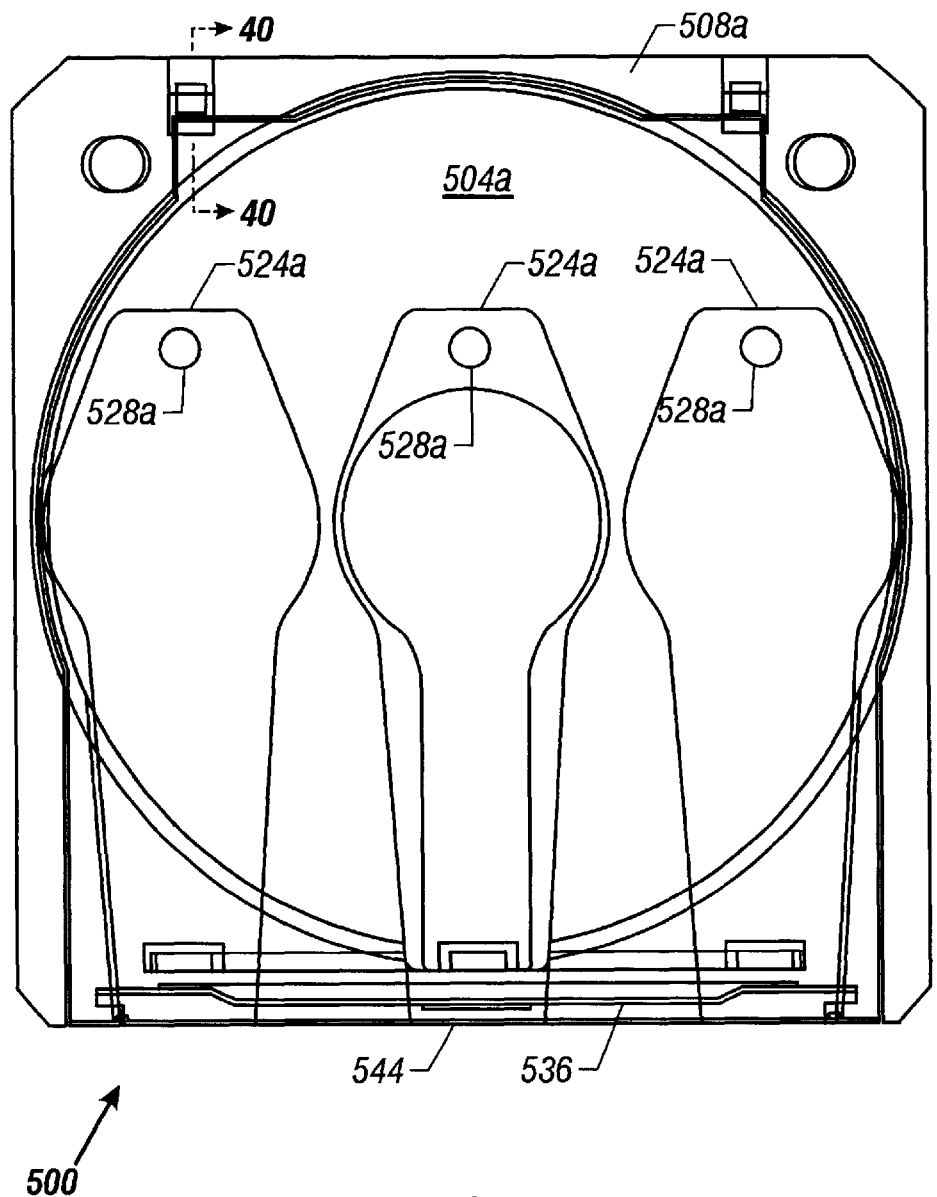
FIG. 38 is a top view of the cartridge assembly of FIG. 37 with the shutter member being depicted in different positions.
Figure 39:
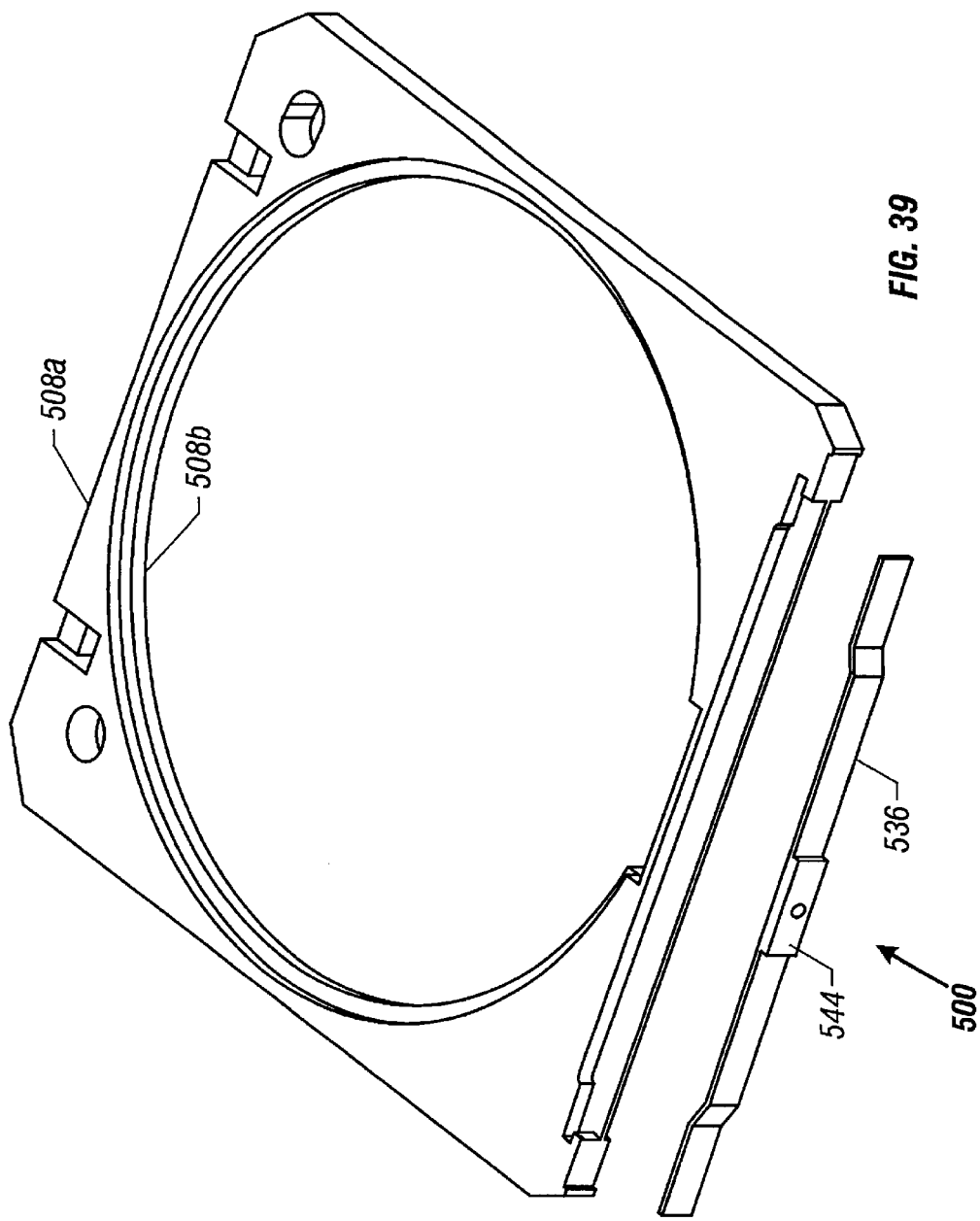
FIG. 39 is an isometric view of selected components of the cartridge assembly of FIG. 37.

A locking subassembly includes an elastic locking member 536 that is secured by the housing members 508a,b at ends 540a,b of the locking member 536. The locking member 536 is biased outwardly to cause the locking projection 544 to engage the rotary arm opening 548 in the shutter 512 when the shutter is in the closed position. When the cartridge assembly is inserted into the disk drive (not shown), the rotary arm (not shown) engages the shutter arm opening 548 and pushes the locking projection 544 inwardly to release the shutter 512. The rotary arm is then able to move the shutter freely from side-to-side to the open position. As shown in FIG. 38, both of the shutter members 524a,b move to the left or right of the circular openings 516a,b and windows 520a,b to permit the optical head to access both operational surfaces of the medium. When the cartridge assembly is removed from the disk drive, the rotary arm moves the shutter back to the closed position. When the rotary arm disengages the rotary arm opening 548, the locking projection 544 is reinserted into the opening 548 to lock the shutter 512 in the closed position.

Figure 40:
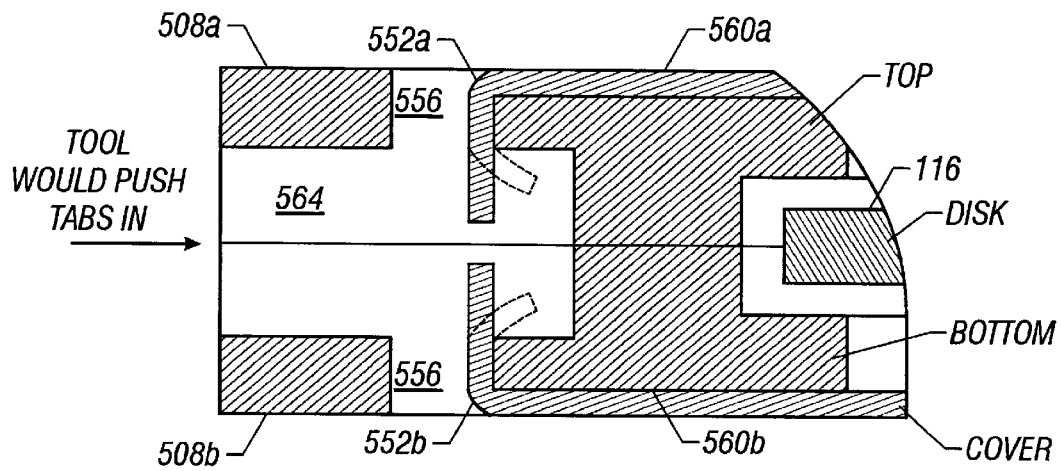
FIG. 40 is a cross-sectional view taken along line 40—40 of FIG. 37.

FIG. 40 shows the method used to lock the metal cover in position during manufacture. Each side of the metal cover 504a,b has downwardly bent tabs 552a,b which are inserted into a passage 556 oriented normal to the longitudinal plane of the medium 116 and cartridge assembly walls 560a,b. A suitable tool is then inserted through the transverse passage 564 (which is located on an end of the cartridge assembly) to deform the tabs 552a,b inwardly as shown by the dotted lines and thereby lock the metal cover in position. Accordingly, the assembly is free of welds and adhesives.

Figure 41:
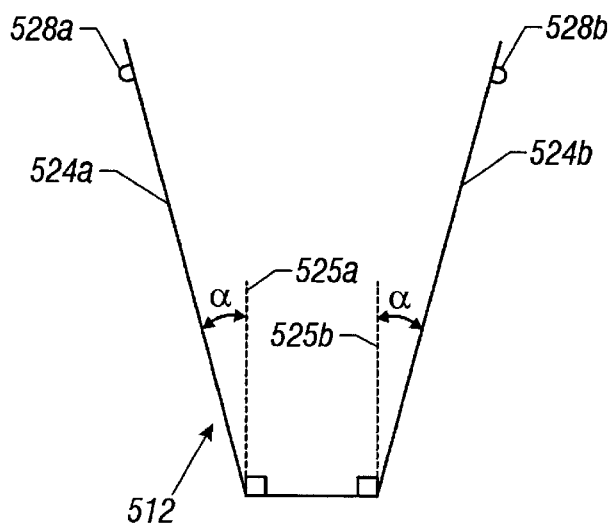
FIG. 41 is a side view of the shutter member of FIG. 37 prior to insertion in the cartridge assembly.

FIG. 41 depicts the appearance of the shutter before insertion into the cartridge assembly. The shutter is underbent to bias the shutter outwardly when the shutter is inserted into the cartridge assembly as shown in FIG. 30. After insertion, the shutter members 524a,b are moved or rotated to a position substantially parallel to lines 525a,b. This outward biasing prevents the shutter 512 from contacting the operational surface of the disk. In one configuration, the angle a ranges from about 5 to about 25°.

Referring again to FIG. 37, the cartridge assembly is manufactured by aligning the medium 116 with the circular opening 570a,b of each housing member 508a,b, placing the locking member 536 in position, adhering the housing members 508a,b together, placing shutter 512 in position, positioning the metal cover in position, inserting the tabs 552a–d in the passage 556, and deforming the tabs as shown in FIG. 41.

A number of variations and modifications of the invention can be used. It would be possible to provide for some features of the invention without providing others. For example, the cartridge assembly can be modified to include an annular labyrinth seal between the hub region of the medium and the interior surfaces of adjacent regions of the first and second housing members, as discussed in Ser. No. 09/315,398, supra. Such a seal can further decrease the likelihood that particles can enter into the interior of the cartridge assembly from the external environment. The leading edge of the cartridge can include one or more recesses that may be used to encode by their number, position, shape, depth, or the like, characteristics of the cartridge or disk such as data density, number of recordable sides, formatting, and the like. The cartridge can be configured to provide for recording on only one surface of the medium, such as by having only one window, one shutter member, and/or being configured to prevent inserting of the cartridge into the disk drive in an attitude other than with the window accessible to drive optics. The side(s) of the cartridge can include one or more grooves for engaging one or more guide rails of the disk drive to assist in desired alignment or positioning of the cartridge with respect to the drive. The cartridge assembly can include vents to cause expulsion of particles located inside of the cartridge assembly during disk rotation. As will be appreciated, when the medium or disk is rotated a pressure differential is created, with the pressure internal to the cartridge assembly being greater than the pressure external to the cartridge assembly. One or more vents would permit particles located inside of the cartridge to be expelled due to the pressure differential. The vent(s) can be of any suitable configuration. Preferably, the vent(s) would include one or more features to inhibit particles from entering the cartridge interior when the pressure is equalized (i.e., when the disk is not in rotation). Such features could selectively open the vent(s) only when the pressure differential is at or above a predetermined threshold. An example would be a flap or cover that is moved outwardly by the pressure differential.

The optical storage device and system of the present invention can be used for various types of data storage including storing data for use by computers such as personal computers, laptops, work stations and the like, storage for music or other audio purposes, including storage for MP3 players, digital cameras, motion picture, home video or other video storage purposes, voice data, computer programs and/or data, personal information or data such as medical data, identification, password or encryption/decryption data, credit information, credit or debit card information and the like. Indeed, it is believed that it will be particularly advantageous to provide for use of the storage system and/or medium of the present invention in a wide variety of devices, e.g. to provide for ease of sharing, storing or transmitting of data, e.g. between platforms including, but not limited to devices for play-back, communication or reproduction of data (including, e.g. image, video or music data), such as personal stereo or other personal (or fixed) music reproduction devices, portable or fixed television or video reproduction devices, computer peripheral devices, computer game devices, gaming or gambling devices, still, video or motion picture cameras, automobile stereos or other audio or video devices, purchase or distribution devices such as automatic teller machines or other bank machines, vending machines, and the like.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An apparatus for use in an optical system, comprising:
   an optical storage medium having a first side and a second side for storing information;
   a hub assembly operatively associated with said optical storage medium; and
   a cartridge assembly that contains said optical storage medium and said hub assembly, said cartridge assembly providing access to the optical storage medium, said cartridge assembly including:
      a first optical storage medium protector for use in safeguarding said first side of said optical storage medium against the occurrence of at least a first unwanted event, said first optical storage medium protector configured to move between a first position which provides access to a said first side of said optical storage medium and a second position which denies access to said first side of said optical storage medium; and
      a second optical storage medium protector for use in safeguarding said second side of said optical storage medium against the occurrence of at least a second unwanted event, said second optical storage medium protector configured to move between a first position which provides access to a said second side of said optical storage medium and a second position which denies access to said second side of said optical storage medium, said first optical storage medium protector independently moveble from said second optical storage medium protector.

2. An apparatus, as claimed in claim 1, wherein:
   said hub assembly includes at least a first hub member and said first optical storage medium protector includes at least a first major wall that covers said first hub member.

3. An apparatus, as claimed in claim 2, wherein:
   said first hub member has an outer surface and said first major wall has an inner surface spaced from said outer surface of said first hub member and, when a force is applied member while said first major wall does not contact said optical storage medium.

4. An apparatus, as claimed in claim 1, wherein:
   said second optical storage medium protector includes a locking subassembly having a first position and a second position, when said locking subassembly is in said first position, access to said optical storage medium is blocked and, when said locking subassembly is in said second position, access to said optical storage medium is available.

5. An apparatus, as claimed in claim 1, wherein:
   said hub assembly includes at least a first hub member and said first optical storage medium includes at least a first major wall having flexibility and, when said first major wall is moved toward said first hub member, said first major wall contacts said first hub member while avoiding contact with said optical storage medium.

6. An apparatus for use in an optical system, comprising:
   an optical storage medium having a first side and a second side for storing information;
   a hub assembly operatively associated with said optical storage medium; and
   a cartridge assembly that contains said optical storage medium and said hub assembly, said cartridge assembly providing access to the optical storage medium, said cartridge assembly including:
      a first optical storage medium protector for use in safeguarding said first side of said optical storage medium against the occurrence of at least a first unwanted event, said first optical storage medium protector configured to move between a first position which provides access to a said first side of said optical storage medium and a second position which denies access to said first side of said optical storage medium;
      a second optical storage medium protector for use in safeguarding said second side of said optical storage medium against the occurrence of at least a second unwanted event, said second optical storage medium protector configured to move between a first position which provides access to a said second side of said optical storage medium and a second position which denies access to said second side of said optical storage medium; and
      a third optical storage medium protector that includes a medium constraining member having portions that overlie a peripheral edge of said optical storage medium.

* * * * *